United States Patent
Davis et al.

(10) Patent No.: US 8,940,269 B2
(45) Date of Patent: Jan. 27, 2015

(54) METHODS AND MATERIALS FOR THE THERMOCHEMICAL PRODUCTION OF HYDROGEN FROM WATER

(71) Applicant: California Institute of Technology, Pasadena, CA (US)

(72) Inventors: Mark E. Davis, Pasadena, CA (US); Bingjun Xu, Pasadena, CA (US); Yashodhan Bhawe, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 120 days.

(21) Appl. No.: 13/855,180

(22) Filed: Apr. 2, 2013

(65) Prior Publication Data

US 2013/0266504 A1    Oct. 10, 2013

Related U.S. Application Data

(60) Provisional application No. 61/621,325, filed on Apr. 6, 2012.

(51) Int. Cl.
| | | |
|---|---|---|
| C01B 3/06 | (2006.01) | |
| C01B 3/04 | (2006.01) | |
| C01B 13/02 | (2006.01) | |

(52) U.S. Cl.
CPC .......... C01B 3/063 (2013.01); C01B 3/042 (2013.01); C01B 13/0207 (2013.01); Y02E 60/364 (2013.01)
USPC .......................................... 423/650; 423/579

(58) Field of Classification Search
CPC ..................................................... C01B 3/063
See application file for complete search history.

(56) References Cited

U.S. PATENT DOCUMENTS

| | | | |
|---|---|---|---|
| 7,960,063 B2 | 6/2011 | Manousiouthakis et al. | |
| 2009/0104111 A1* | 4/2009 | Collins et al. | 423/657 |
| 2011/0300064 A1 | 12/2011 | Takeshima | |
| 2013/0252808 A1* | 9/2013 | Yamazaki et al. | 502/303 |

FOREIGN PATENT DOCUMENTS

| | | |
|---|---|---|
| EP | 0188115 | 7/1986 |
| WO | WO 97/05062 | 2/1997 |
| WO | WO 2010/016641 | 2/2010 |
| WO | WO 2013019167 | * 2/2013 |

OTHER PUBLICATIONS

Azad et al., "A novel determination of thermodynamic activities of metals in an AISI 316 stainless steel by a metastable emf method", J. Nucl Mater, 1987, 144, 94-104.

(Continued)

Primary Examiner — Melvin C Mayes
Assistant Examiner — Douglas Call
(74) Attorney, Agent, or Firm — Baker & Hostetler LLP

(57) ABSTRACT

The present invention is directed to a method of thermochemical forming $H_2$, $O_2$, or a combination thereof from water, said method comprising the steps of contacting a composition comprising a spinel-type transition metal oxide of formula $M_3O_4$ with an alkali metal carbonate bicarbonate, or mixture thereof in the presence of $H_2O$ to form $H_2$, $CO_2$, and an alkali metal ion-transition metal oxide; hydrolytically extracting at least a portion of alkali metal ions from the alkali metal ion-transition metal oxide by the reaction with $CO_2$ and liquid $H_2O$; and thermochemically reducing the resulting oxidized-transition metal oxide. The thermochemical reduction of $CO_2$ based on analogous methods is also disclosed.

24 Claims, 19 Drawing Sheets

(56) References Cited

OTHER PUBLICATIONS

Lide, "Standard Thrmodynamic Properties of Chemical Substances", CRC Handbook of Chemistry and Physics, 2008, 5-42, 1 page.

Omomo et al., "Preparation of protonic layered manganates and their intercalation behavior", Solid State Ionics, 2002, 151, 243-250.

Xu et al., "Low-temperature, manganese oxide-based, thermochemical water splitting cycle", PNAS, Jun. 12, 2012, vol. 109, No. 24, 9260-9264.

Xu et al., "Spinal metal oxide-alkali carbonate-based, low-temperature thermochemical cycles for water splitting and $CO^2$ reduction", Chemical Engineering, California Institute of Technology, Mar. 2013, 44 pages.

* cited by examiner

METHODS AND MATERIALS FOR THE THERMOCHEMICAL PRODUCTION OF HYDROGEN FROM WATER

CROSS REFERENCE TO RELATED APPLICATIONS

This application claims priority to U.S. Patent Application No. 61/621,325, filed Apr. 6, 2012, the contents of which are incorporated by reference herein in their entirety.

TECHNICAL FIELD

This disclosure relates to the field of energy storage, including the thermochemical production of hydrogen and CO, from water and $CO_2$, respectively.

BACKGROUND

There is a considerable amount of under-utilized thermal energy from high-temperature heat sources (>700° C.), e.g., nuclear power plants, because the maximum operating temperature for steam turbines is typically below 650° C. (primarily limited by the corrosiveness of high pressure, high temperature steam).

Thermochemical cycles for water splitting or $CO_2$ reduction are able to convert thermal energy into chemical energy stored in hydrogen and CO, respectively. Water ($CO_2$) is split into stoichiometric amounts of hydrogen (CO) and oxygen in a series of chemical reactions via a closed thermochemical cycle, with heat as the only energy input. No other products are produced in these cycles.

Two types of thermochemical cycles are generally used for this purpose: high-temperature, two-step cycles and low-temperature, multistep cycles. The former usually employs relatively simple reactions and benign chemicals, e.g., transition metals and metal oxides; however, the operating temperature required to close the cycle is typically higher than 1500° C. Currently, heat sources with such high temperatures, e.g., high temperature solar concentrators, are still scarce. In contrast, heat sources at temperature range of 700-1000° C. are much more abundant, e.g., nuclear power plants and medium-scale solar concentrators. In addition, high-temperature operating fluids, e.g., molten salts, have been developed to work in this temperature range. Low-temperature multistep thermochemical cycles are designed to operate at 700-1000° C.; however, the toxic and corrosive chemicals involved pose significant environmental and engineering challenges. For example, in each reaction of the three-step sulfur-iodine thermochemical cycle for water splitting, with a highest operating temperature of 850° C., at least one of the following chemicals are involved: $H_2SO_4$, HI, $SO_2$ and $I_2$.

There is a need for thermochemical water splitting cycles that involve non-corrosive solids and operate at below 1,000° C. The disclosed inventions address these needs.

SUMMARY

The disclosed inventions take advantage of new cycles that use low-temperature multistep and high-temperature two-step cycles. In certain embodiments, a new thermochemical water splitting cycle is provided that uses non-corrosive solids that can operate with a temperature at or below about 850° C. In other embodiments, the invention provides a new $CO_2$ reduction cycle based on analogous methods.

Also provided are methods for thermochemically forming $H_2$, $O_2$, or a combination thereof from water, each method comprising: (a) contacting a composition comprising a spinel-type transition metal oxide of formula $M_3O_4$ with an alkali metal carbonate, bicarbonate, or mixture thereof in the presence of $H_2O$ at a first temperature in a range of from about 450° C. to about 1000° C. to form $H_2$, $CO_2$, and an alkali metal ion-transition metal oxide, said alkali metal ion-transition metal oxide having an average transition metal oxidation state that is higher than the average oxidation state of the transition metal in the spinel-type transition metal oxide; (b) hydrolytically extracting at least a portion of alkali metal ions from the alkali metal ion-transition metal oxide by the reaction with $CO_2$ and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1250° C., with the associated formation of $O_2$; wherein the transition metal, M, comprises iron, manganese, or a combination thereof, and the corresponding spinel-type transition metal oxide comprises $Fe_3O_4$, $Mn_3O_4$, or a solid solution or physical mixture thereof; and wherein the alkali metal ion comprises sodium ion, potassium ion, or a combination thereof.

Also provided are methods for thermochemically forming $H_2$, $O_2$, or a combination thereof from water, each method comprising: (a) contacting a composition comprising a spinel-type $Mn_3O_4$ with sodium carbonate in the presence of $H_2O$ at a first temperature in a range of from about 550° C. to about 900° C., preferably about 850° C., to form $H_2$, $CO_2$, and a sodium birnessite-type $A_xMnO_2(0<x<1)$, preferably derived from $\alpha$-$NaMnO_2$, the sodium birnessite-type manganese dioxide having an average transition metal oxidation state that is higher than the average oxidation state of the transition metal in the spinel-type $Mn_3O_4$; (b) hydrolytically extracting at least a portion of sodium cations from the sodium birnessite-type manganese dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising a protonic birnessite in which the average oxidation state of the transition metal in the protonic birnessite is the same as the average oxidation state of the transition metal in the sodium birnessite-type manganese oxide; and (c) thermochemically reducing the transition metal composition of step (b) at a third temperature in a range of from about 550° C. to about 900° C., preferably about 850° C., with the associated formation of $O_2$.

Still other embodiments include methods comprising: (a) contacting a composition comprising a spinel-type $Fe_3O_4$ with sodium or potassium carbonate, or a mixture thereof, in the presence of $H_2O$ at a first temperature in a range of from about 550° C. to about 900° C., preferably about 850° C., to form $H_2$, $CO_2$, and a sodium- or potassium-type $A_xFeO_2$ (0<x<1), preferably $NaFeO_2$ or $KFeO_2$, the sodium- or potassium-type iron dioxide having an average transition metal oxidation state that is higher than the average oxidation state of the transition metal in the spinel-type $Fe_3O_4$; (b) hydrolytically extracting at least a portion of sodium cations from the sodium- or potassium-type iron dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising $Fe_2O_3$ or a hydrated form thereof, in which the average oxidation state of the transition metal is the same as the average oxidation state of the transition metal in the $Fe_2O_3$ or a hydrated form thereof; and (c) thermochemically reducing the transition metal composition of step (b) at a third temperature in a range of from about 1150° C. to about 1250° C., with the associated formation of $O_2$.

Additional methods are provided which comprise: (a) contacting a composition comprising a spinel-type transition metal oxide of formula $M_3O_4$ with an alkali metal carbonate, bicarbonate, or mixture thereof, in the absence of $H_2O$ at a first temperature in a range of from 450° C. to 1000° C. to form CO, and an alkali metal ion-transition metal oxide, said alkali metal ion-transition metal oxide having an average transition metal oxidation state that is higher than the average oxidation state of the transition metal in the spinel-type transition metal oxide; (b) hydrolytically extracting at least a portion of alkali metal ions from the alkali metal ion-transition metal oxide by the reaction with $CO_2$ and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1250° C., preferably about 1150° C., with the associated formation of $O_2$; wherein the transition metal, M, comprises iron, and the corresponding spinel-type transition metal oxide comprises $Fe_3O_4$; and wherein the alkali metal ion comprises sodium ion, potassium ion, or a combination thereof.

BRIEF DESCRIPTION OF THE DRAWINGS

The disclosed inventions are further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

| Step | Reaction | Temp (° C.) |
|---|---|---|
| 1 | $3Na_2CO_3(s) + 2Mn_3O_4(s) \rightarrow$ $4NaMnO_2(s) + 2CO_2(g) +$ $2MnO(s) + Na_2CO_3$ | 850 |
| 2 | $2MnO(s) + Na_2CO_3(s) + H_2O(g) \rightarrow$ $H_2(g) + CO_2(g) + 2NaMnO_2(s)$ | 850 |
| 3 | $6NaMnO_2(s) + ayH_2O(l) + (3+b)CO_2(g) \rightarrow$ $3Na_2CO_3(aq) +$ $aH_2MnO_2 \cdot yH_2O(s) +$ $bMnCO_3(s) + cMn_3O_4(s)$ | 80 |
| 4 | $aH_xMnO_2 \cdot yH_2O(s) + bMnCO_3 \rightarrow$ $(2-c)Mn_3O_4(s) + ayH_2O(g) + bCO_2(g) + 0.5O_2(g)$ | 850 |
| Net | $H_2O(g) \rightarrow H_2(g) + 0.5O_2(g)$ | |

In one exemplary embodiment, steps 1, 2, and 4 are conducted at 850° C. and step 3 is conducted at 80° C.

FIG. 3 illustrates the changes accompanying the addition of sodium carbonate is essential for low temperature water decomposition on $Mn_3O_4$. FIG. 3(A) provides thermodynamic estimates showing that $Na_2CO_3$ enables oxidation of $Mn_3O_4$ by $H_2O$. ΔG for α-$NaMnO_2$ is adopted from Azad et al., *J. Nucl Mater.* 144:94-104 (1987) and the remainder of thermodynamic data are derived from Lide, D. R., *CRC Handbook of Chemistry and Physics*, (CRC, New York, 2008), pp 5-42; FIG. 3(B) reflects the production of $D_2$ and $CO_2$ in the oxidation of $Mn_3O_4$ to form α-$NaMnO_2$ by $D_2O$ in the presence of $Na_2CO_3$ at 850° C. FIG. 3(C) profiles the water splitting ($D_2O$) on the mixture of MnO and $Na_2CO_3$ (2:1) to form $D_2$ and $CO_2$ and $NaMnO_2$. FIG. 3(D) profiles the evolution of $D_2$ for the 5 cycles tested. Experimental conditions are identical to those in FIG. 3(B).

Figure 4:
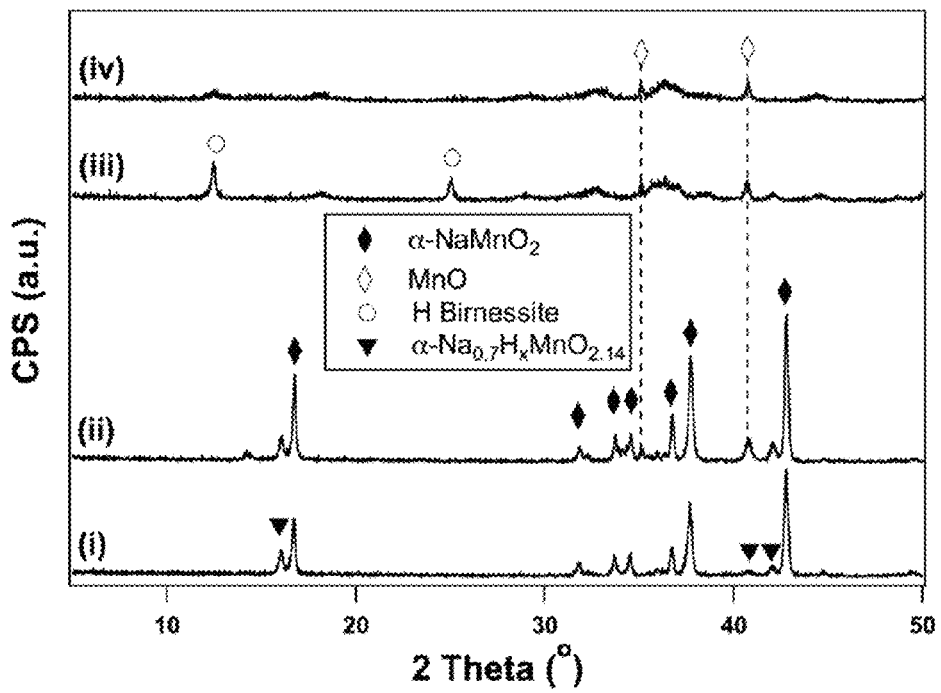

FIG. 4 provides powder X-ray diffraction patterns used to identify solids phases in hydrogen evolution steps. (i) Solid collected after the hydrogen evolution step (after step 2); (ii) solid collected after reacting $Mn_3O_4$ with $Na_2CO_3$ at 850° C. (after step 1); (iii) sample from (ii) hydrolyzed in an aqueous suspension in the presence of $CO_2$ at 80° C. for 3 h; and (iv) sample from (iii) annealed 180° C. in Ar for 1 h.

Figure 5:
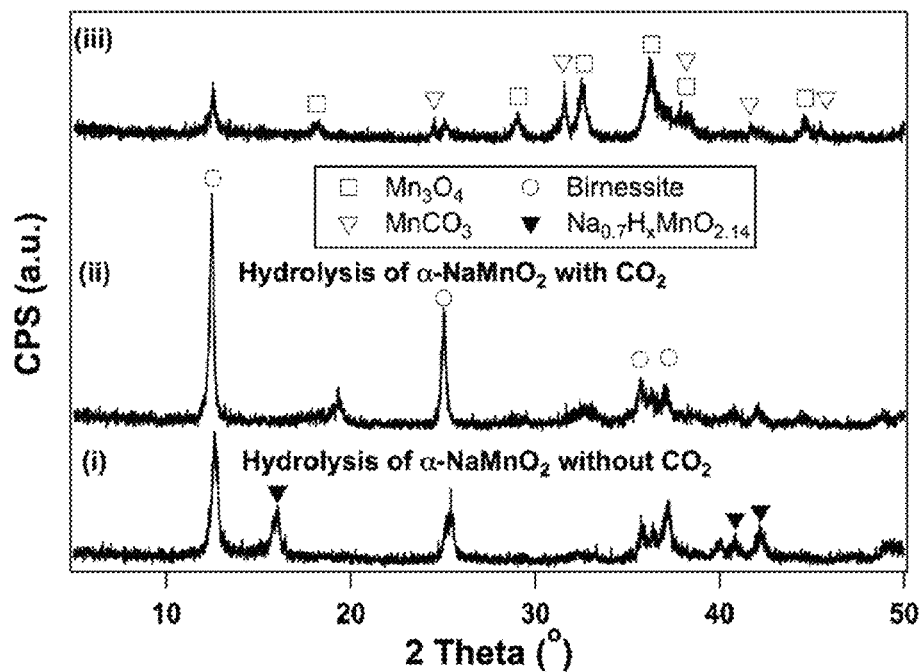

FIG. 5 provides powder X-ray diffraction patterns used to identify intermediate phases in hydrolysis of α-$NaMnO_2$. (i) Hydrolysis of α-$NaMnO_2$ in an aqueous suspension at 80° C. for 3 h; (ii) hydrolysis of α-NaMnO2 in an aqueous suspension at 80° C. for 3 h with bubbling $CO_2$ and (iii) hydrolysis of α-$NaMnO_2$ in water vapor and $CO_2$ under hydrothermal condition at 140° C. for 5 h.

Figure 6A:
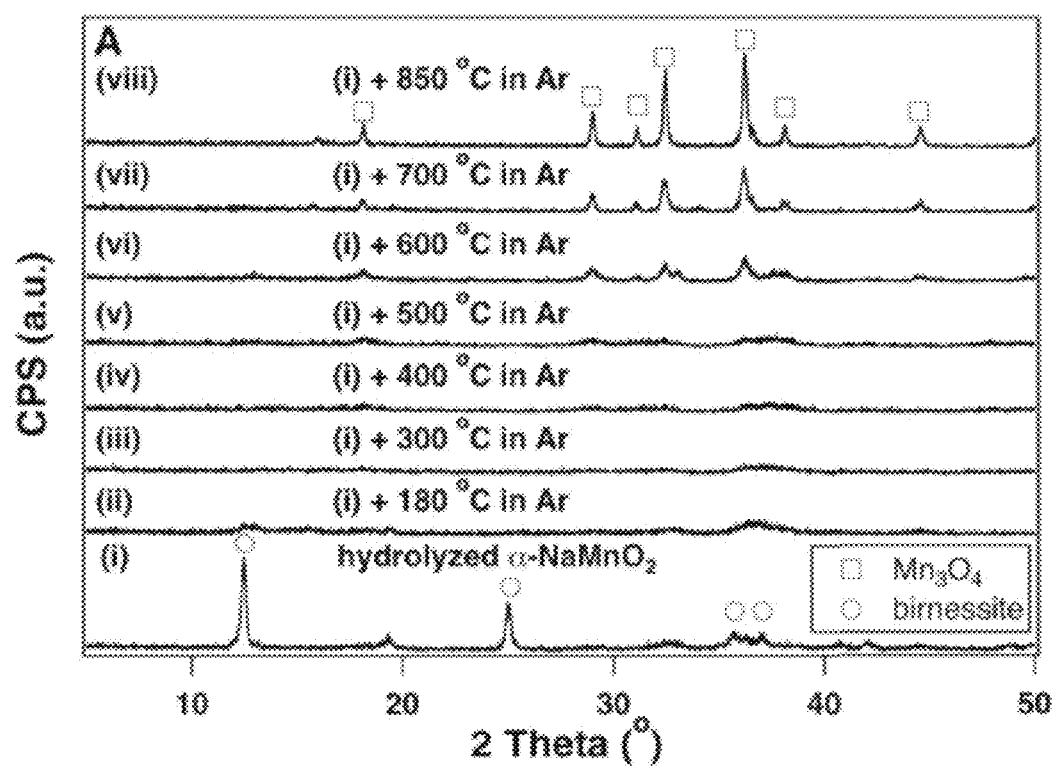
Figure 6B:
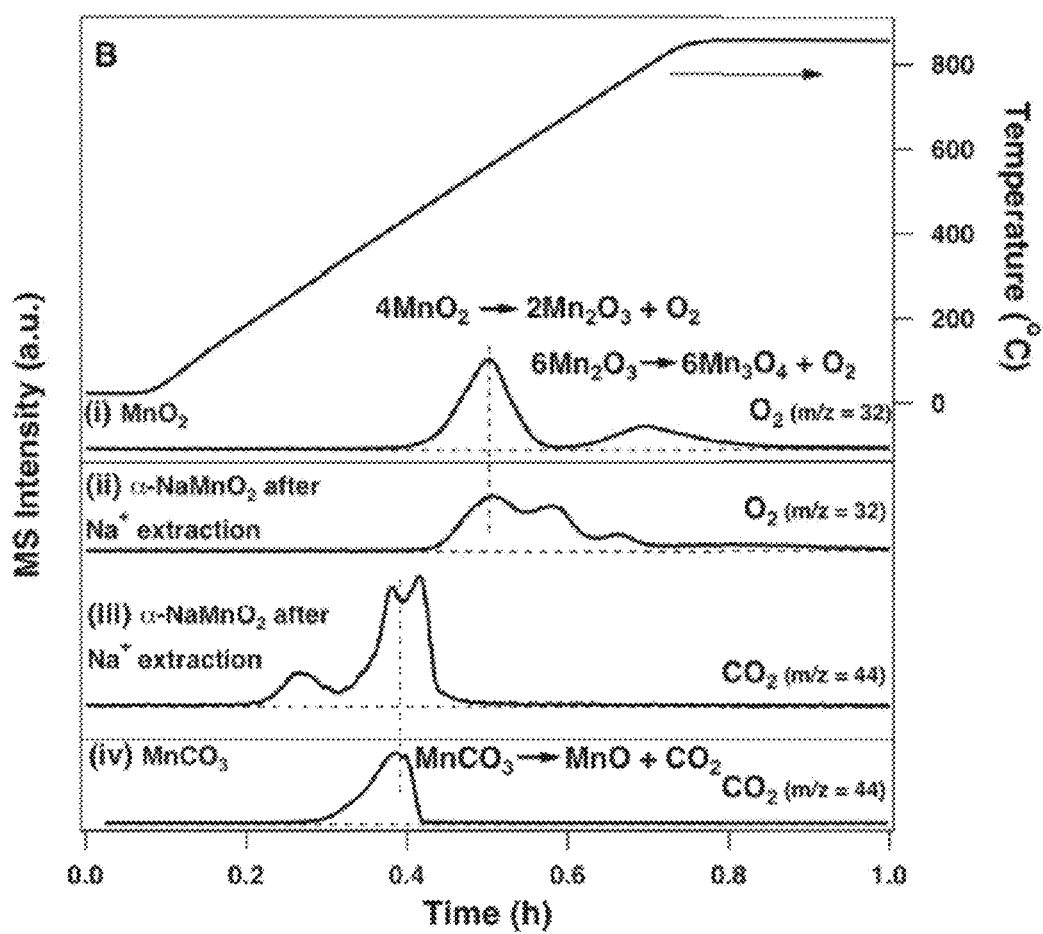

FIG. 6 provides data for the thermal reduction of $Na^+$ extracted α-$NaMnO_2$. FIG. 6(A) shows X-ray diffraction patterns of: (i) $Na^+$ extracted α-$NaMnO_2$, and (i) after annealing at (ii) 180° C., (iii) 300° C., (iv) 400° C., (v) 500° C., (vi) 600° C., (vii) 700° C. and (viii) 850° C. in Ar for 1 h. FIG. 6(B) provides mass spectral data from temperature programmed reaction of: (i) $MnO_2$, (ii) and (iii) $Na^+$ extracted α-$NaMnO_2$ and (iv) $MnCO_3$.

Figure 7:
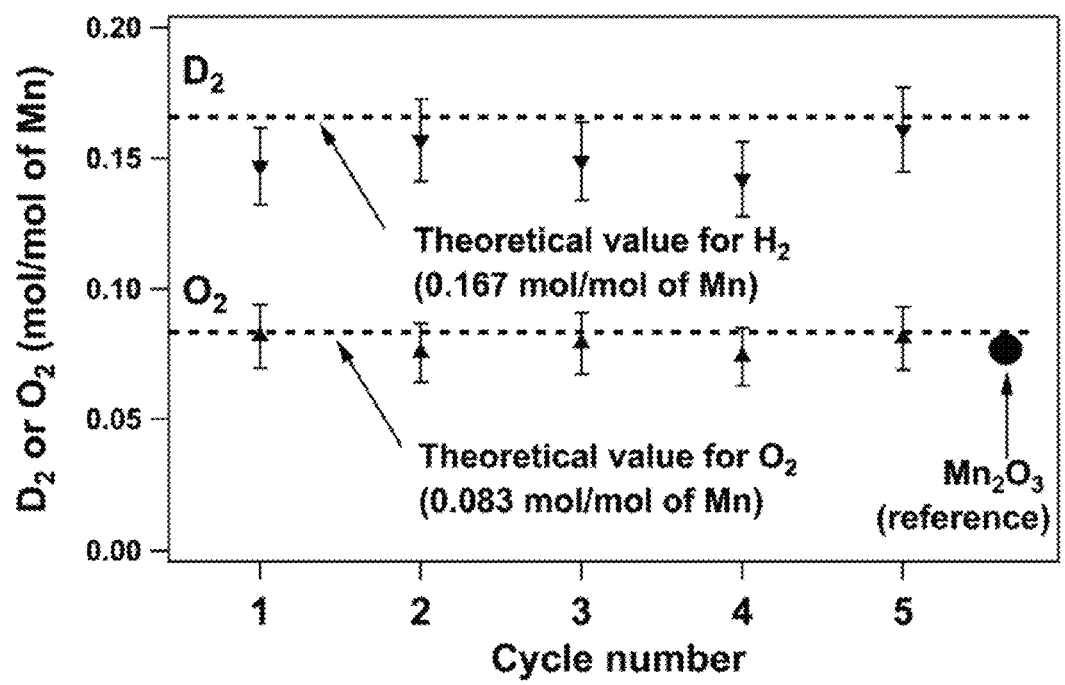

FIG. 7 illustrates $D_2$ and $O_2$ yields from multiple cycles of the Mn-based thermochemical water splitting system.

Figure 8:
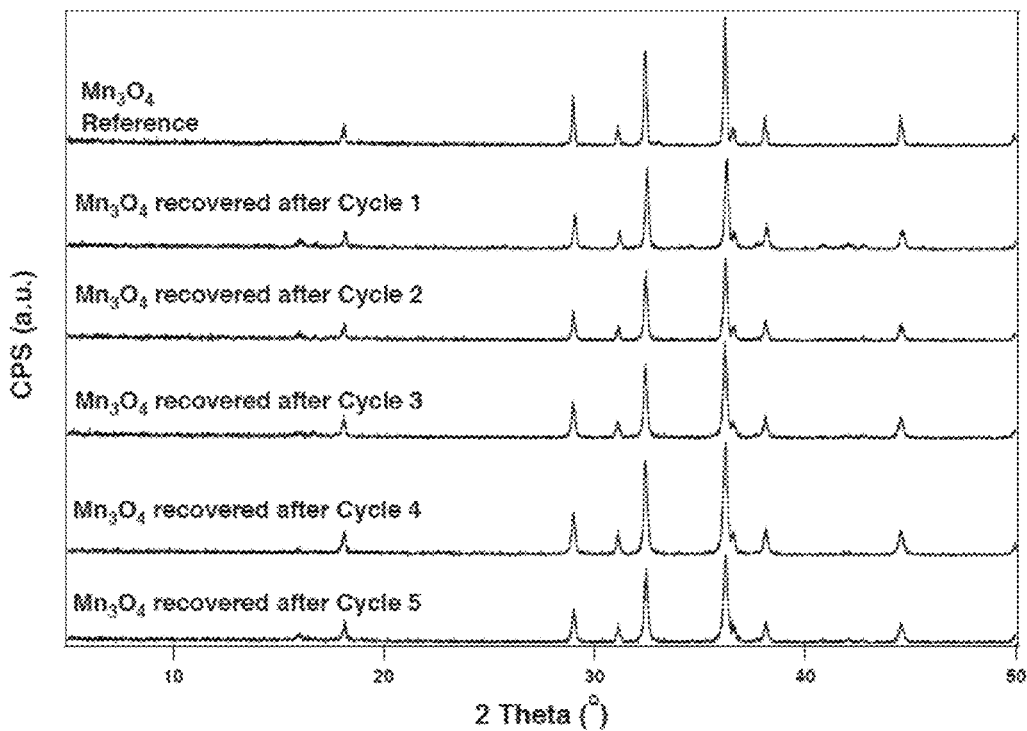

FIG. 8 provides X-ray diffraction patterns for $Mn_3O_4$ recovered after the oxygen evolution step in the recycleability study of Example 7.

Figure 9:
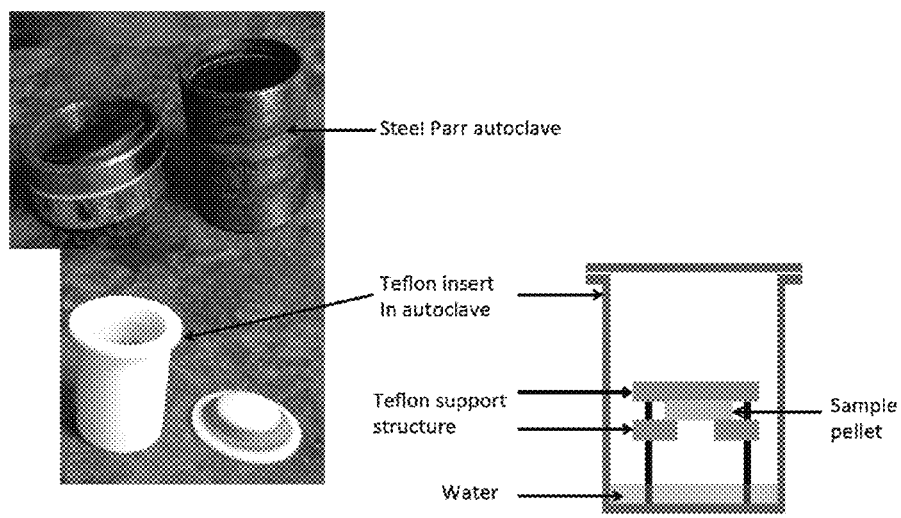

FIG. 9 provides an exemplary reactor configuration for examining the hydrolytic extraction steps described in Example 8.

Figure 10:
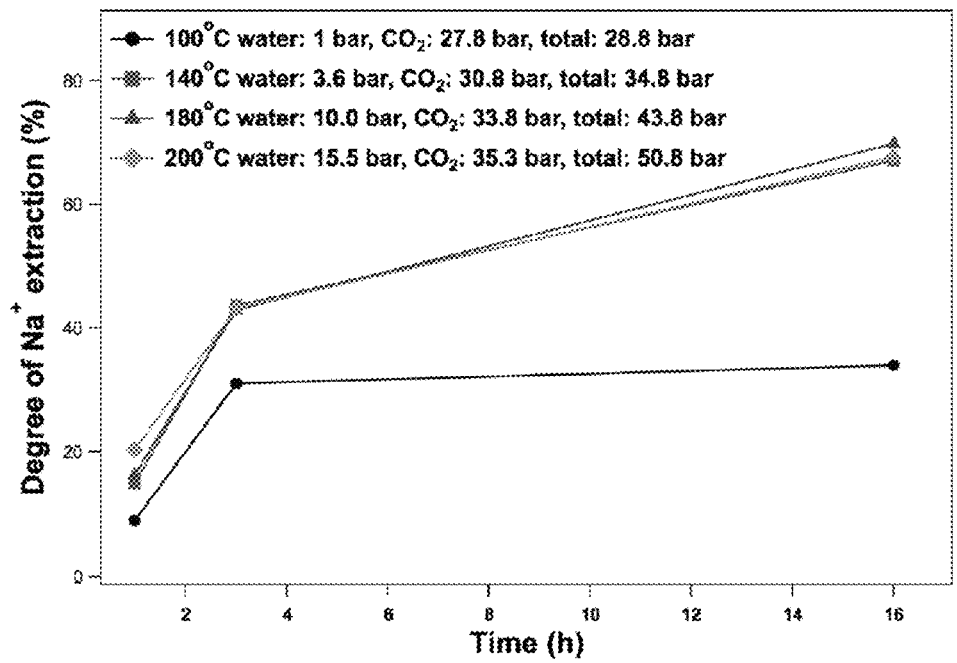

FIG. 10 illustrates the degree of hydrolytic sodium ion extraction from $NaMnO_2$, as a function of elevated temperature and pressures, as described in Example 8.

Figure 11:
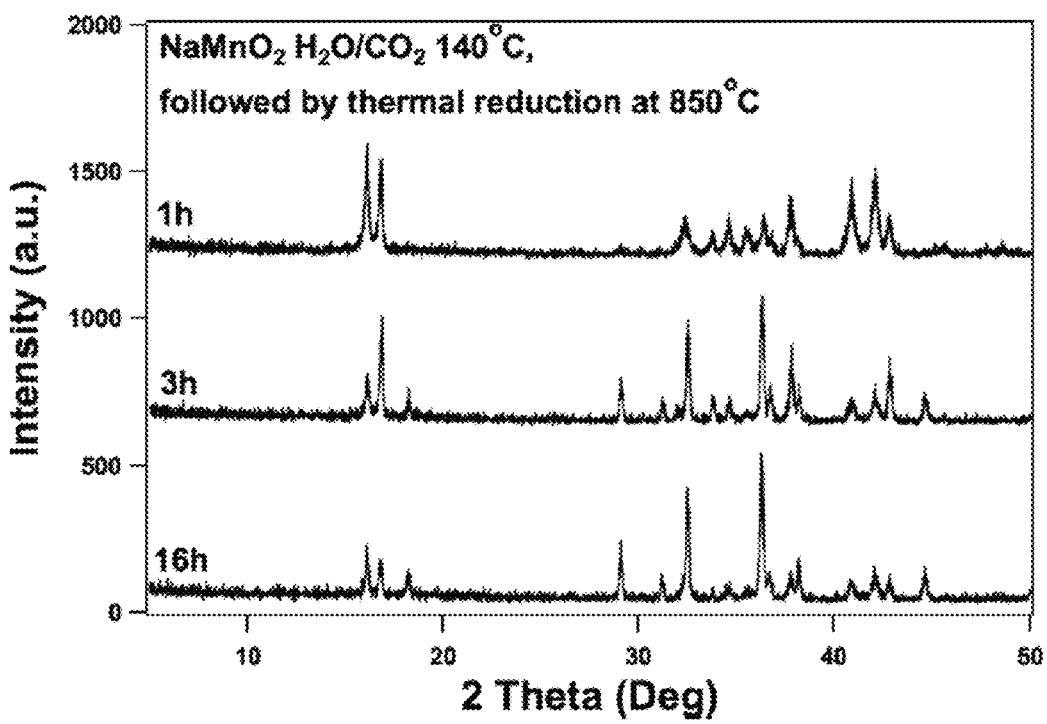

FIG. 11 provide X-ray diffraction patterns for samples from which sodium ions were extracted, followed by thermal reduction at 850° C.

Figure 12:
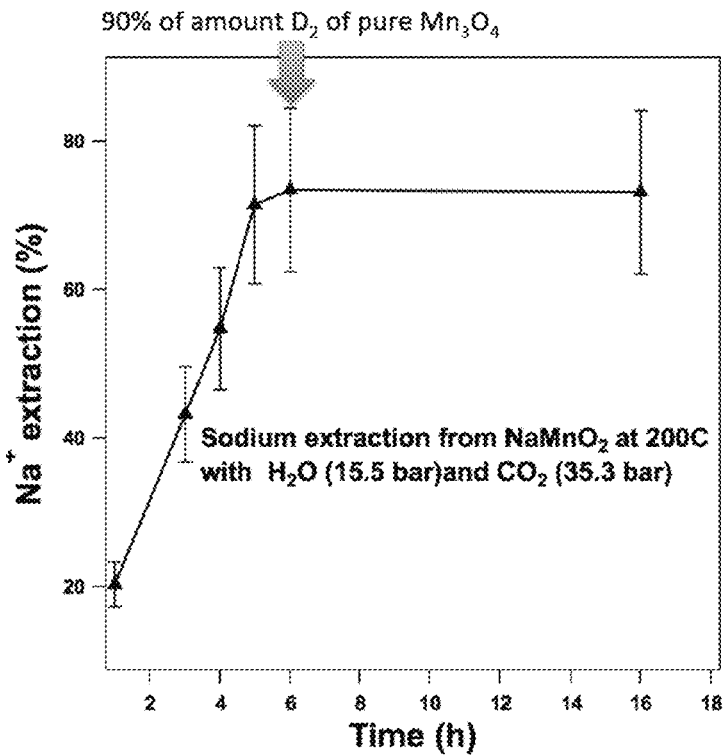

FIG. 12 shows the degree of hydrolytic sodium ion extraction from $NaMnO_2$, as a function of time at 200° C. and elevated $CO_2$ pressure. The amount of $D_2$ produced provides another gauge of the effectiveness of the ion extraction.

Figure 13:
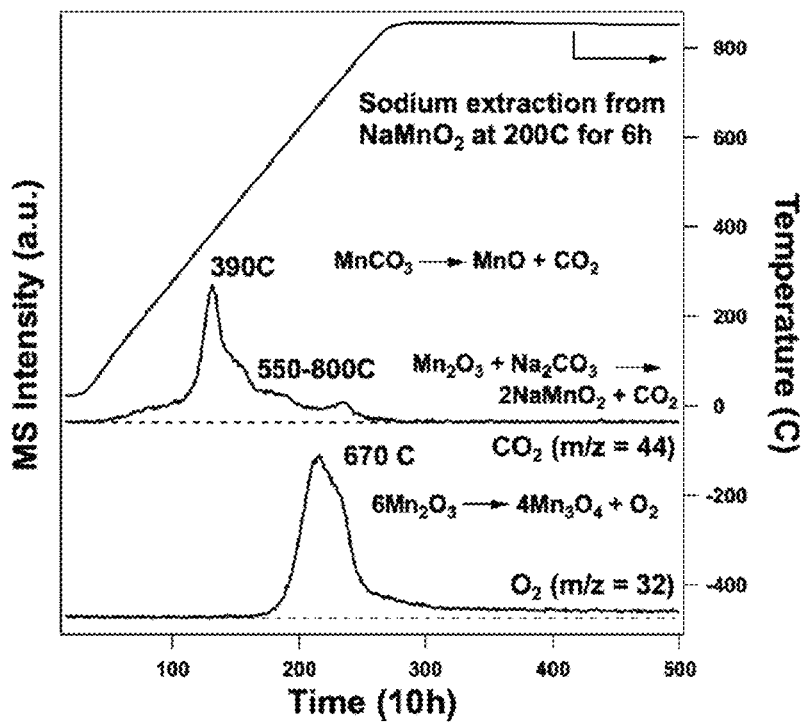

FIG. 13 provides gas evolution data from temperature programmed reaction of $Mn_2O_3$ with $Na_2CO_3$ and $MnCO_3$.

Figure 14:
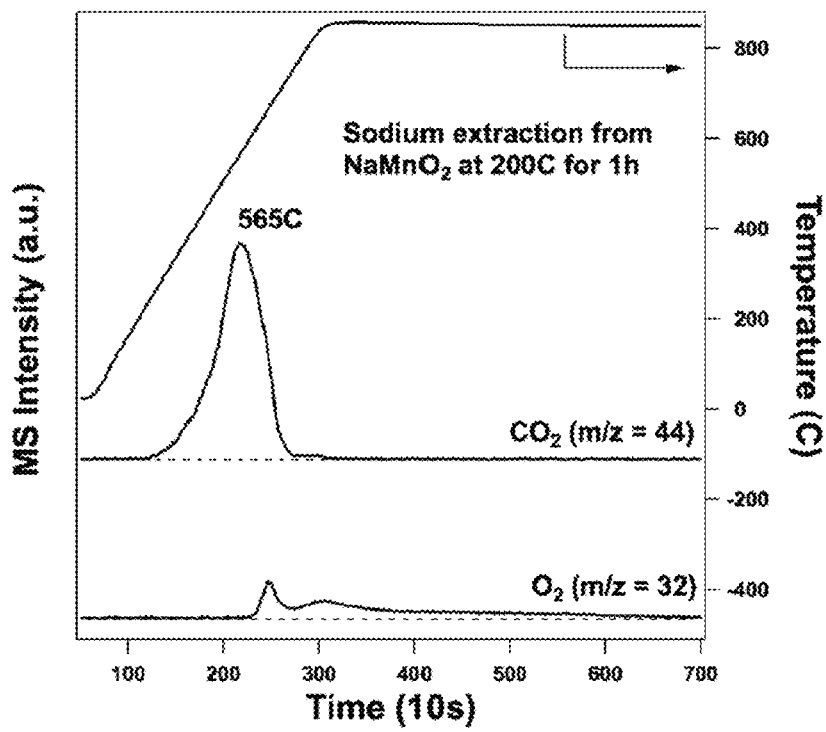

FIG. 14 provides gas evolution data from temperature programmed reduction of the product resulting from the 200° C. extraction of sodium ion from $NaMnO_2$.

Figure 15:
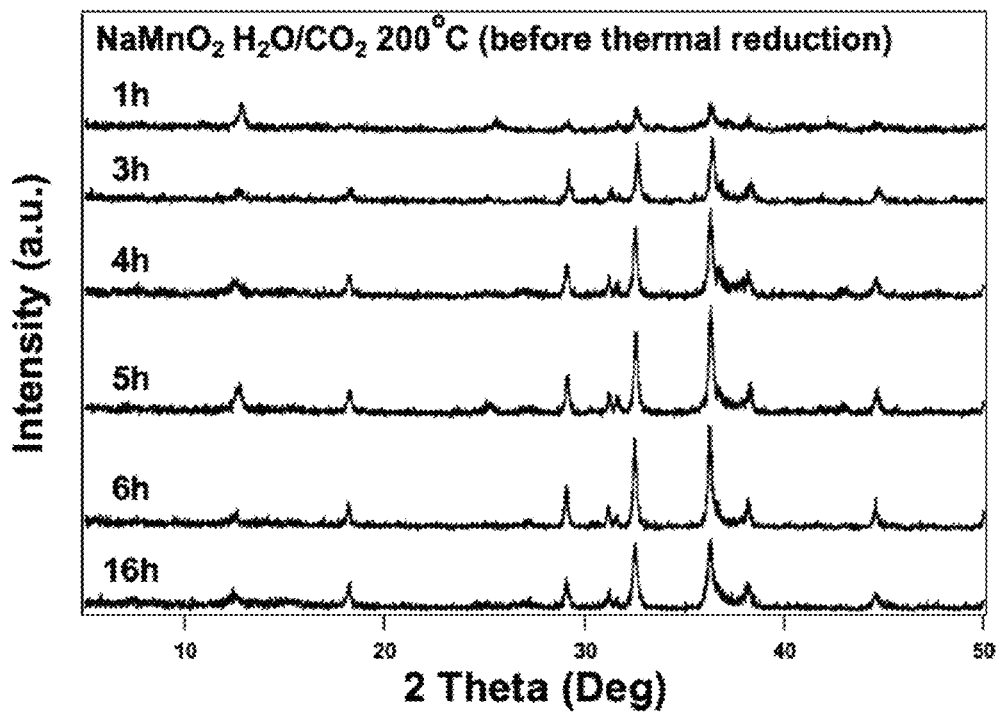

FIG. 15 provides X-ray diffraction patterns for samples, as a function of time, from which sodium ions were extracted at 200° C., before thermal reduction.

Figure 16:
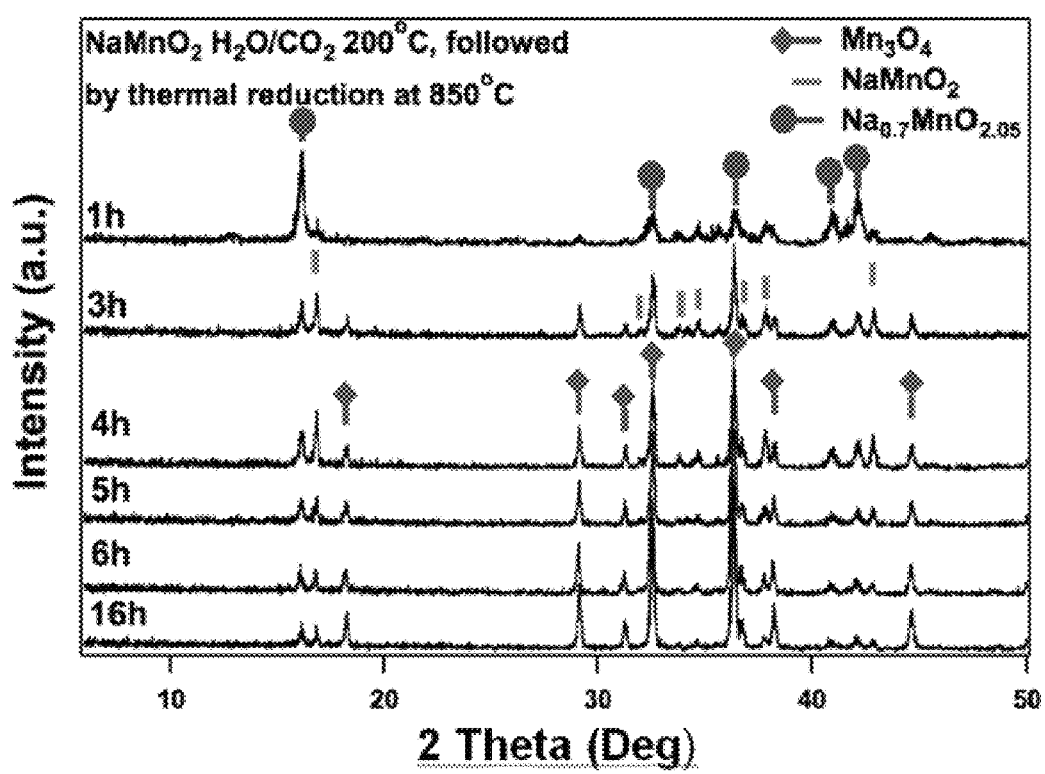

FIG. 16 provides X-ray diffraction patterns for samples, taken as a function of time from experiments in which sodium ions were extracted at 200° C., followed by thermal reduction at 850° C.

Figure 17A:
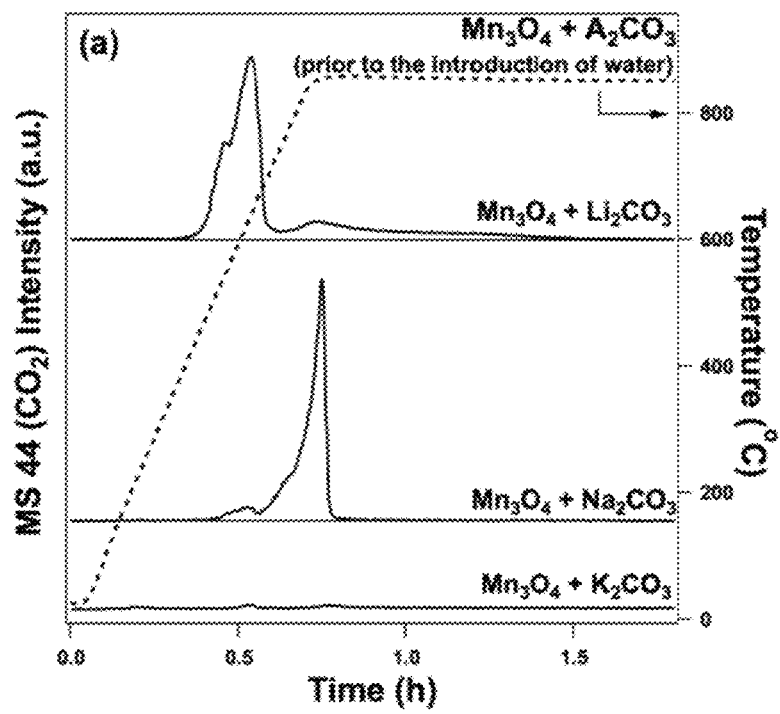
Figure 17B:
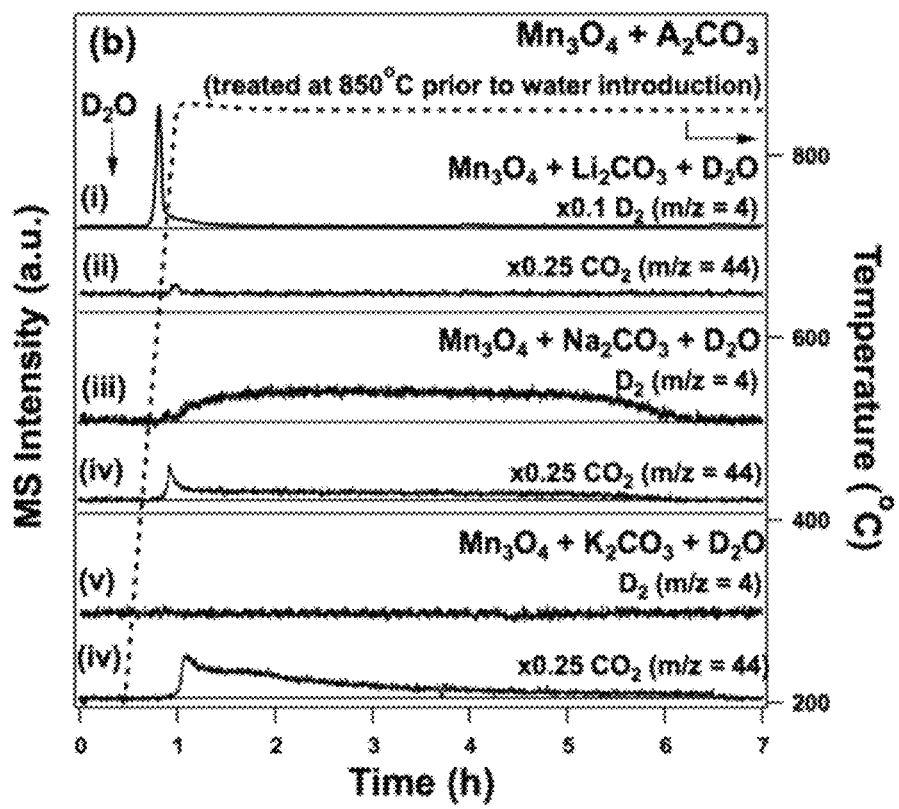

FIG. 17 illustrates (FIG. 17A) the reaction of $Mn_3O_4$ with $Li_2CO_3$ (top trace), $Na_2CO_3$ (middle trace) and $K_2CO_3$ (bottom trace) in the absence of water; (FIG. 17B) Solids after the thermal treatment at 850° C. in FIG. 17A were cooled down to 200° C., before $D_2O$ was introduced. The samples were then subjected to a temperature ramp-and-hold treatment to 850° C. in $D_2O/Ar$ (5%/95%). (i, ii) $D_2$ and $CO_2$ traces for $Mn_3O_4/Li_2CO_3$; (iii, iv) $D_2$ and $CO_2$ traces for $Mn_3O_4/Na_2CO_3$; and (v, iv) $D_2$ and $CO_2$ traces for $Mn_3O_4/K_2CO_3$.

Figure 18A:
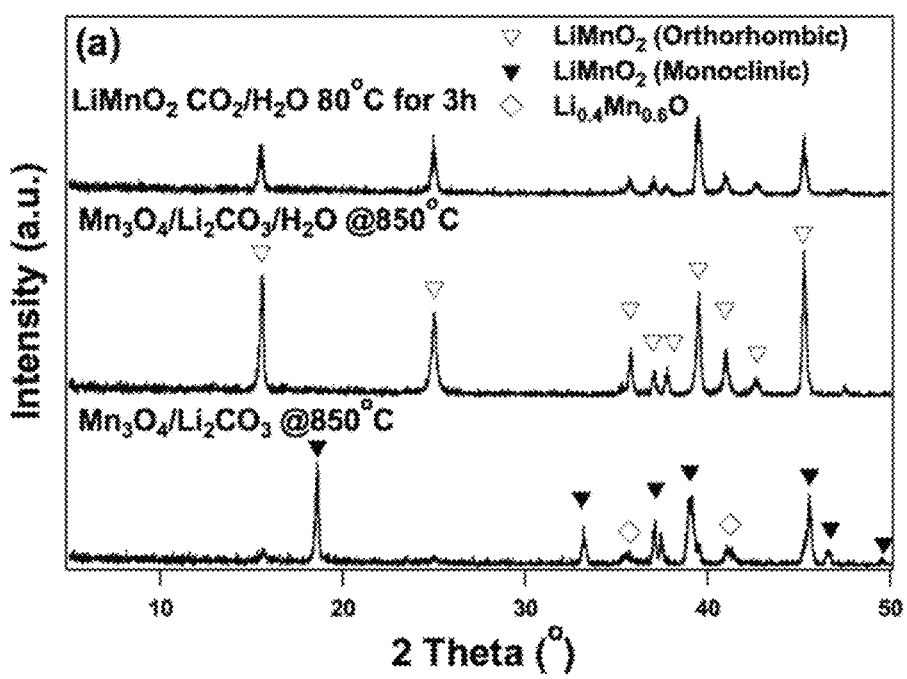
Figure 18B:
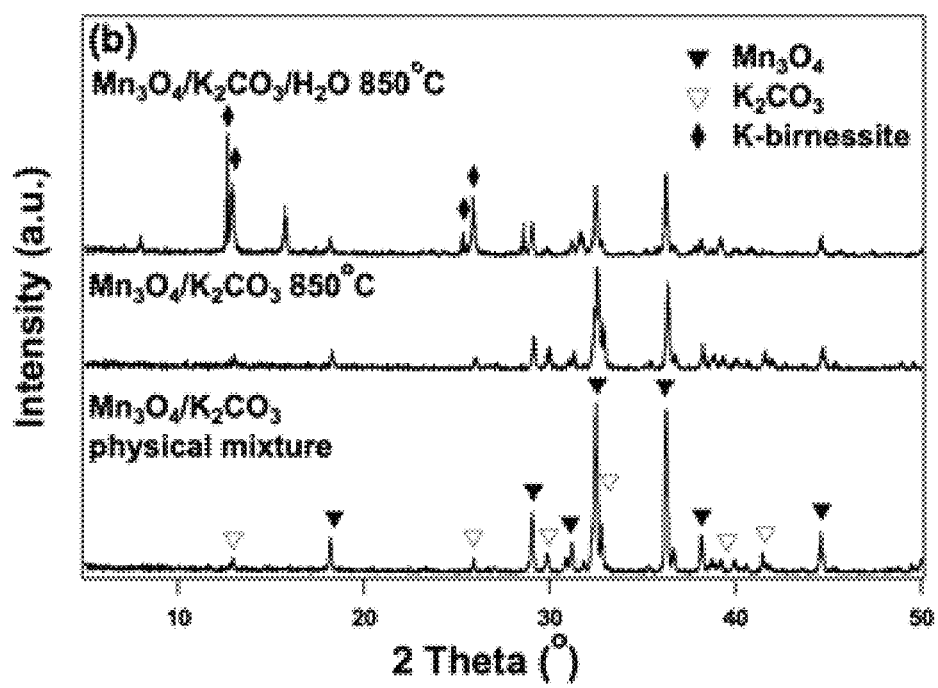
Figure 19:
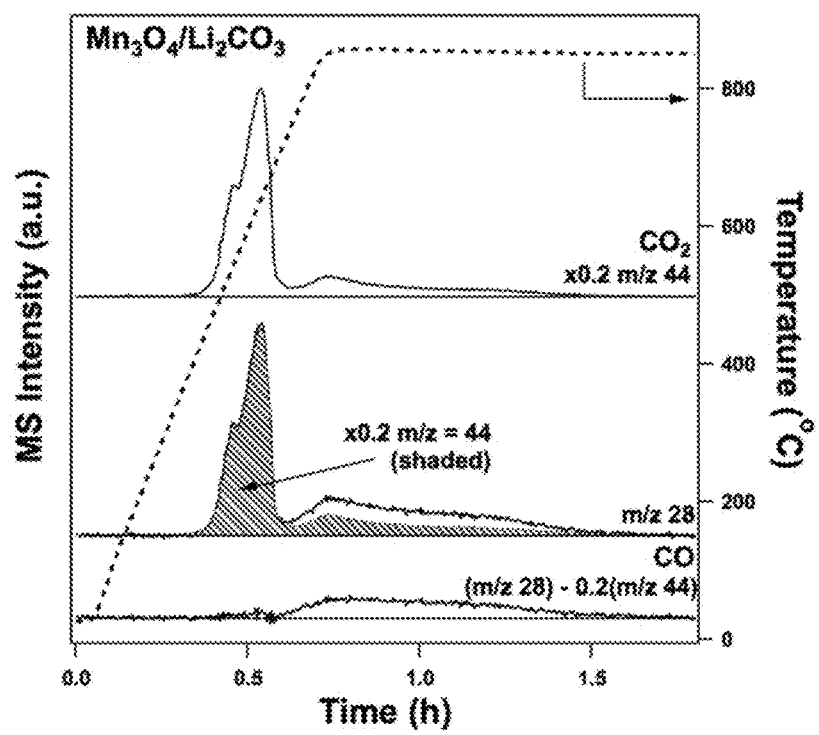

FIG. 18 shows powder X-ray diffraction (XRD) patterns identifying intermediate phases in reaction of $Mn_3O_4$ with alkali carbonates (molar ratio 2:3) under various conditions. FIG. 18A shows the results when a mixture of $Mn_3O_4$ and $Li_2CO_3$ was heated to 850° C. before (bottom trace) and after (middle trace) the introduction of water. The top trace shows the diffraction pattern of the solid recovered after hydrolyzing $LiMnO_2$ in an aqueous suspension at 80° C. with $CO_2$ bubbling through for 3 h. FIG. 18B. Physical mixture of $Mn_3O_4$ and $K_2CO_3$ at room temperature (bottom trace) and heated to 850° C. prior (middle trace) and after (top trace) the introduction of water FIG. 19 shows mass fragmentation analysis showing $CO_2$ is reduced to CO when reacting with $Mn_3O_4$ and $Li_2CO_3$.

Figure 20:
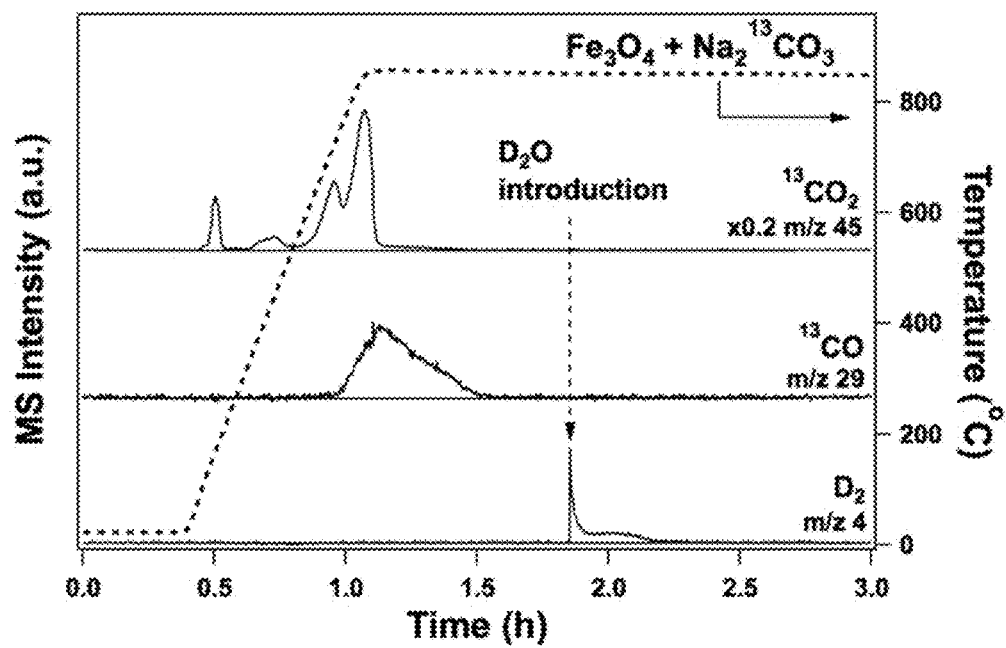

FIG. 20 shows the reaction of $Fe_3O_4$ with $Na_2{}^{13}CO_3$ confirming the reduction of $^{13}CO_2$ to $^{13}CO$ prior to the introduction of water.

Figure 21:
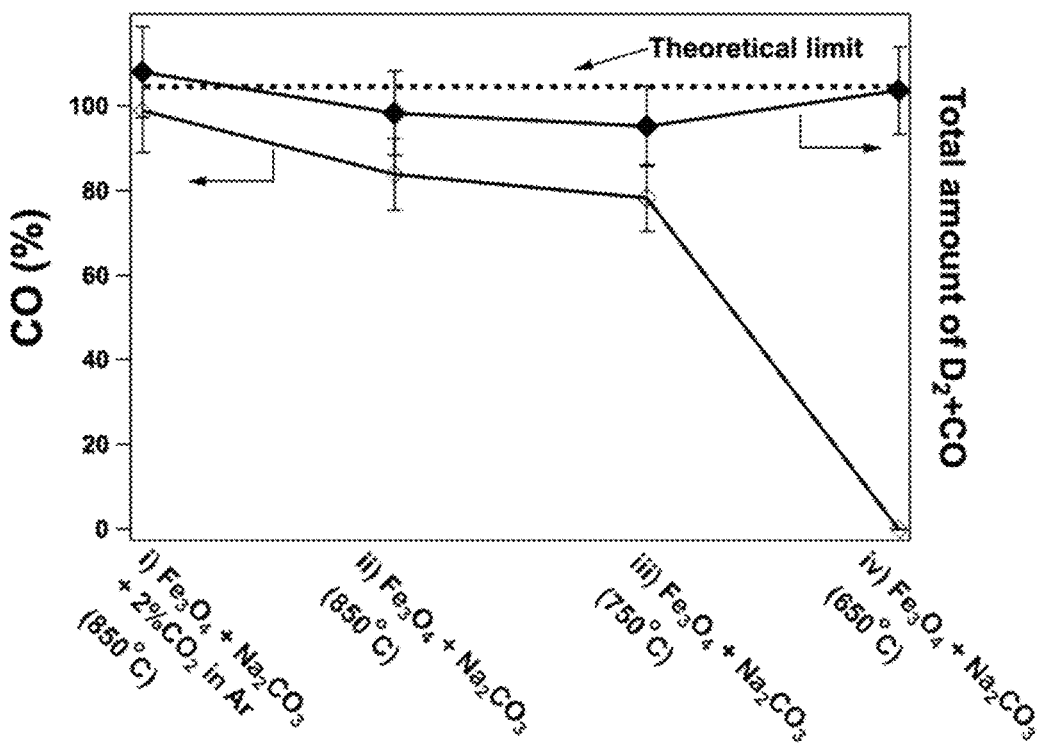

FIG. 21 shows the percentage of CO of the reduction products ($H_2$ and CO) and total amount of $H_2$ and CO formed when the physical mixture of $Fe_3O_4/Na_2CO_3$ (molar ratio 2:3) reacts i) at 850° C. with 2% $CO_2$ in the carrier gas (Ar); ii) at 850° C. in Ar; iii) at 750° C. in Ar; and iv) at 650° C. in Ar. $D_2O$ was introduced after the completion of $CO_2$ evolution from the decomposition of $Na_2CO_3$ to oxidize the remaining Fe(II) species to Fe(III). The dashed line shows the theoretical maximum amount of $H_2$ and CO can be formed per mole of Mn.

Figure 22:
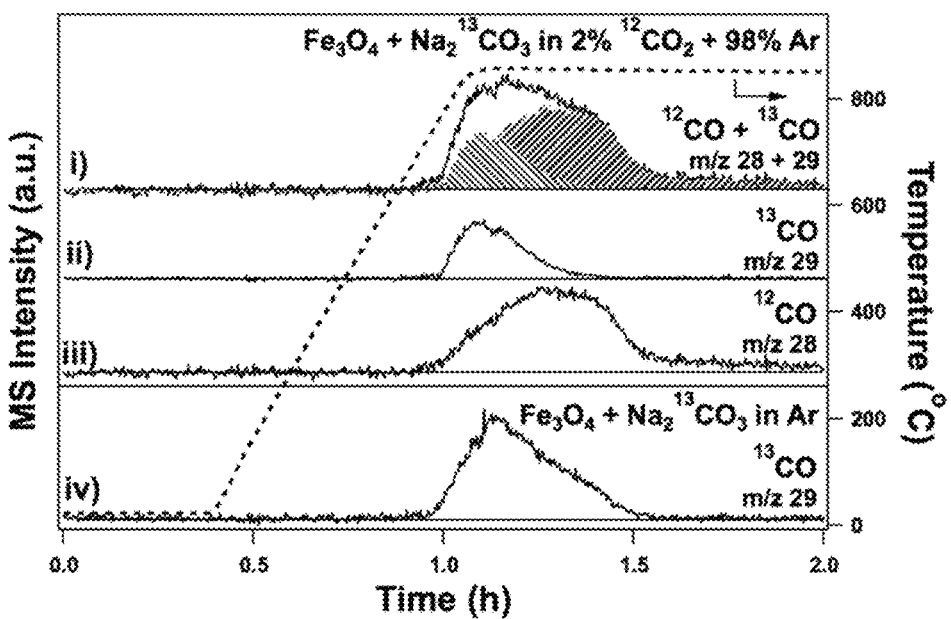

FIG. 22 shows $CO_2$ reduction with $Fe_3O_4/Na_2{}^{13}CO_3$ in the presence (i), ii) and iii)) and absence (iv)) of $^{12}CO_2$ in the feed.

Figure 23:
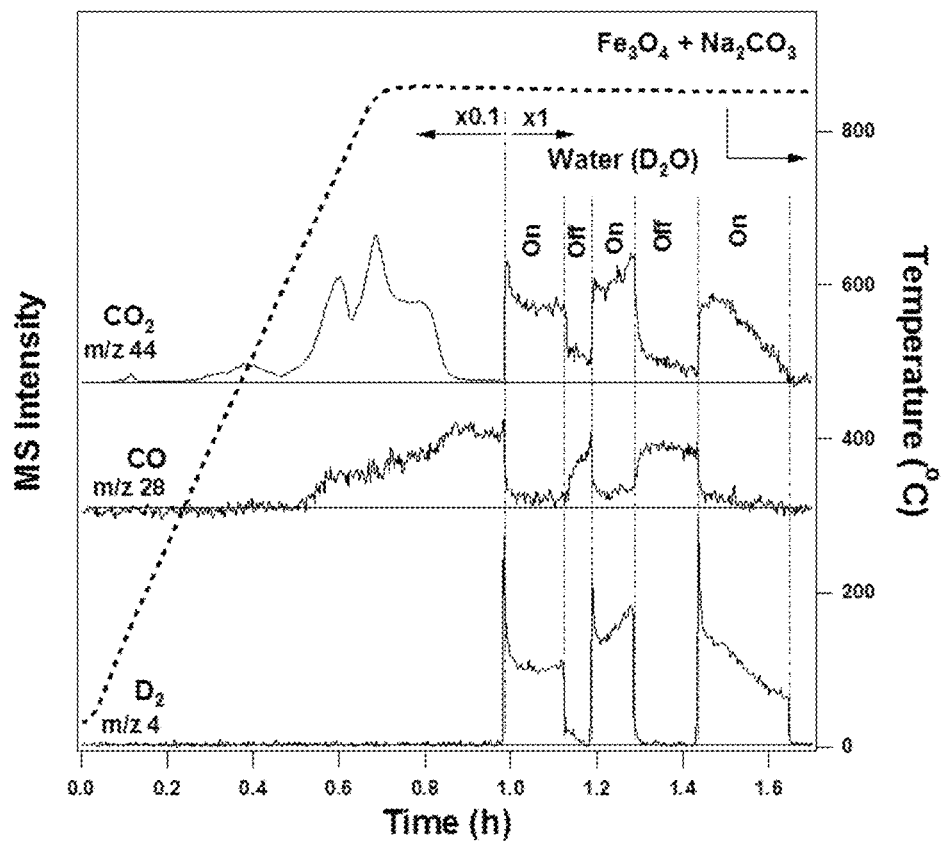

FIG. 23 shows the results of water pulse experiments that show that the relative concentration of $CO_2$ and water controls the contribution of hydrogen evolution and $CO_2$ reduction over $Fe_3O_4$ and $Na_2CO_3$. The part of the data enclosed in the box is used to for the product distribution analysis.

Figure 24:
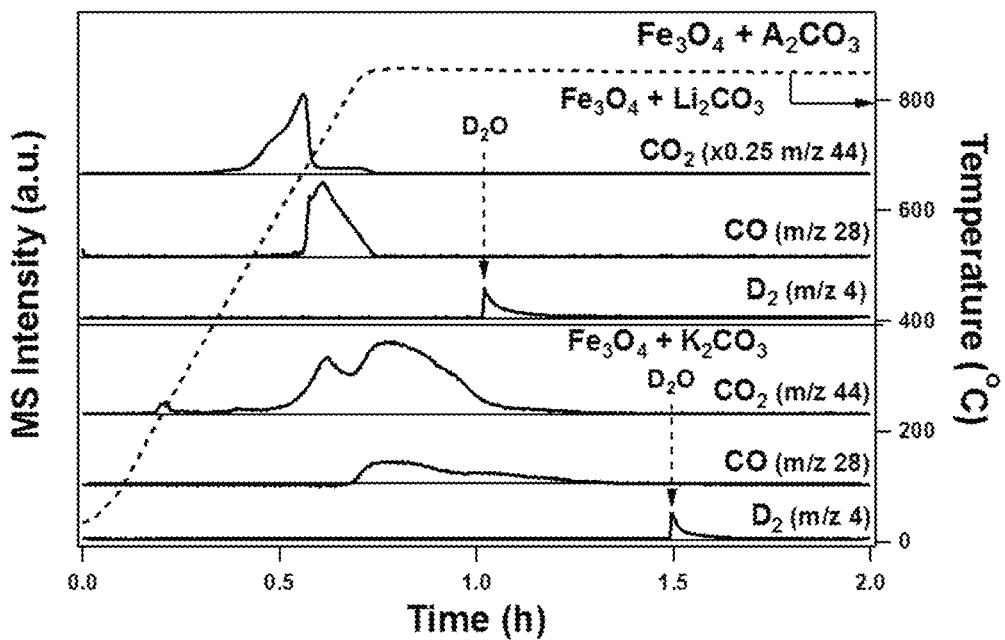

FIG. 24 shows both $CO_2$ reduction and hydrogen evolution associated with the reactions of $Fe_3O_4$ with $Li_2CO_3$ and $K_2CO_3$.

Figure 25:
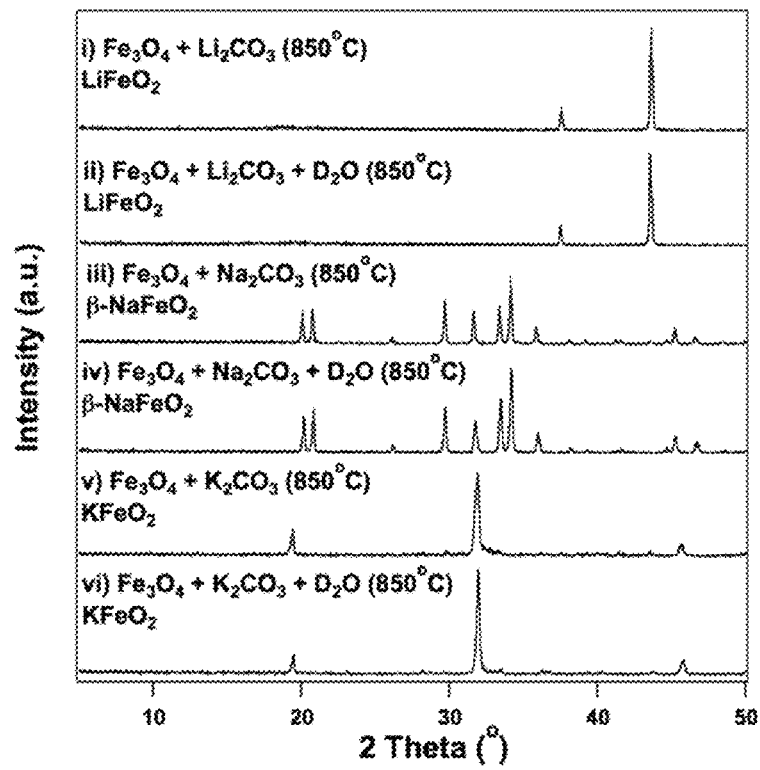

FIG. 25 shows X-ray diffraction patterns of solids collected after reacting the physical mixture of $Fe_3O_4$ and alkali carbonates in the absence and presence of $D_2O$ at 850° C.

Figure 26:
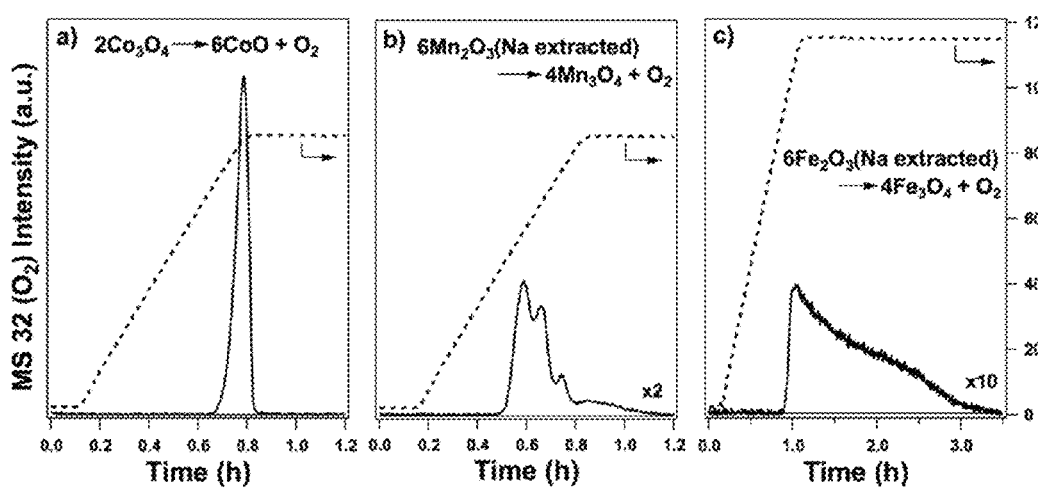

FIG. 26 illustrates the thermal reduction of (A) $Co_3O_4$, (B) Na ion extracted $Mn_2O_3$ and (C) Na ion extracted $Fe_2O_3$.

DETAILED DESCRIPTION OF ILLUSTRATIVE EMBODIMENTS

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the methods of preparing the desired products, as well as the use of the products so prepared, and vice versa.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely,"

"only" and the like in connection with the recitation of claim elements, or use of a "negative" limitation. Finally, while an embodiment may be described as part of a series of steps or part of a more general structure, each said step or part may also be considered an independent embodiment in itself.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

Various embodiments of the present invention provide methods of thermochemically forming $H_2$, $O_2$, or a combination thereof from water, under catalytic conditions, each method comprising: (a) contacting a composition comprising a spinel-type transition metal oxide of formula $M_3O_4$ with an alkali metal carbonate, bicarbonate, or mixture thereof in the presence of $H_2O$ at a first temperature in a range of from about 450° C. to about 1000° C. (or to about 950° C., to about 900° C., or to about 850° C.) to form $H_2$, $CO_2$, and an alkali metal ion-transition metal oxide, said alkali metal ion-transition metal oxide having an average transition metal oxidation state that is higher than the average oxidation state of the transition metal in the spinel-type transition metal oxide; (b) hydrolytically extracting at least a portion of alkali metal ions from the alkali metal ion-transition metal oxide by the reaction with $CO_2$ and liquid $H_2O$ at a second temperature in a range of from about 60° C. to about 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion -transition metal oxide; and (c) thermochemically reducing the transition metal composition of step (b) at a third temperature in a range of from about 450° C. to about 1250° C., with the associated formation of $O_2$; wherein the transition metal, M, comprises iron, manganese, or a combination thereof, and the corresponding spinel-type transition metal oxide comprises $Fe_3O_4$, $Mn_3O_4$, or a solid solution or physical mixture thereof (preferably comprising manganese and $Mn_3O_4$); and wherein the alkali metal ion comprises sodium ion, potassium ion, or a combination thereof In some embodiments, the thermochemical reduction of the oxidized-transition metal oxide results in a regeneration of the spinel-type transition metal oxide of (a).

As described above, each of these steps (a)-(c) is considered an individual embodiment, as are any combination of those steps (e.g., at least two of the steps comprising (a) and (b), or (a) and (c), or (b) and (c). Further, any reference to $H_2O$ should be interpreted as including isotopes of $H_2O$, including $D_2O$.

The net reaction of these embodiments comprises the stoichiometric splitting of water to hydrogen and oxygen, accompanied by changes in the overall net oxidation step of the metals. In this context, the term "spinel-type transition metal oxide" is well understood by those skilled in the relevant art as describing a particular crystal lattice configuration of metal oxides, having an overall empirical formula $M_3O_4$. As used herein, particularly with respect to Co, Fe, and Mn, while each individual metal center may have a nominal integral value (e.g., +2 and +3), the overall net oxidation state of the average metal center is 2⅔.

The term "alkali metal ion-transition metal oxide" refers to the compound or composition in which at least a portion of the compound or composition of comprises stoichiometric or substoichiometric amount of lattice alkali metal ions. Examples of this in the present context include compositions having a nominal formulae $A_xMO_2$ (0<x<1), where A is an alkali metal ion and M is the transitional metal ion corresponding to the spinel-type transition metal oxide, and preferably where x is higher than about 0.5, about 0.6, about 0.7, about 0.8, or about 0.9, or is nominally about 1. $NaFeO_2$, $KFeO_2$, and α-$NaMnO_2$ are examples of such structures. Such compositions typically comprise layered structures in which the alkali metal ions are positioned between octahedrally coordinated metal oxide layers. Importantly, the mean oxidation of the transition metal centers in such compositions are higher than the average oxidation state of the corresponding spinel metal oxide; that is, the action of the alkali metal carbonate or bicarbonate allows for oxidizing the metal while reducing water to form hydrogen. In the case of $NaFeO_2$, $KFeO_2$, and α-$NaMnO_2$, for example, the nominal oxidation state of the Fe or Mn is +3. The "portion" of alkali metal ions, in this situation, is sufficient to stabilize the higher oxidation state. Unless otherwise specified, "at least a portion" refers to at least 50% of the metal oxide compostiion or compound contains alkali metal ion, e.g., as $AMO_2$, though additional specific individual embodiments include those where at least about 50%, at least about 60%, at least about 70%, at least about 80%, at least about 90%, at least about 95%, or substantially all of the metal oxide composition or compound contains alkali metal ion, e.g., as $AMO_2$.

The terms "transition metal composition comprising an oxidized ion extracted-transition metal oxide" or simply "oxidized ion extracted-transition metal oxide" refer to a transition metal oxide that has a mean metal center oxidation state that is higher than the corresponding spinel transition metal oxide, preferably and/or typically the same or similar to the average oxidation state of that in the alkali metal ion-transition metal oxide, and which has a level of intercalated alkali metal ion which, if any, is depleted relative to the amount of the alkali metal ion in the corresponding alkali metal ion-transition metal oxide. Preferably, the mean oxidation states of the metals of the alkali metal ion-transition metal oxide and the oxidized ion extracted-transition metal oxide are the same and the amount of alkali metal ions within the oxidized ion extracted-transition metal oxide is substantially or practically zero. Practical realities of extraction kinetics or structure may compromise this preferred condition.

In certain embodiments of the methods, the step (a) of contacting the composition comprising a spinel-type transition metal oxide of formula $M_3O_4$ with an alkali metal carbonate, bicarbonate, or mixture thereof is done stepwise first in the absence and then in the presence of $H_2O$. See, e.g., the Examples. In other embodiments, the contacting of the spinel-type transition metal oxide of formula $M_3O_4$ with an alkali metal carbonate, bicarbonate, or mixture thereof is done in entirely in the presence of water. In still other embodiments, including those where the spinel transition metal oxide is $Fe_3O_4$, the step (a) may be done entirely in the absence of water, in which case, the iron may be oxidized by the carbonate itself (see, e.g., Example 10, Table 1).

Some embodiments provide that the carbonate, bicarbonate, or mixture thereof comprises a carbonate of sodium or potassium. Sodium carbonate may be preferred in the case of a manganese system, while sodium or potassium carbonates may be suitable for use with iron systems. In such cases, the corresponding alkali metal ion-transition metal oxide can comprise a composition having an empirical formula $AMO_2$, where A represents the alkali metal ion.

The several embodiments of the inventive methods have thus far been described as comprising steps involving at least three separate temperatures. These temperatures are intended to reflect both static hold temperatures and transitional temperatures. For those embodiments where static hold temperatures are employed, such temperatures also include temperature profiles having ramped heat-up and cool-down conditions. Non-limiting exemplars of such temperature profiles are described in the Examples. In certain embodiments, the first and third temperatures are both higher than the second temperature, and may be nominally the same or different. In independent embodiments, the first and third temperatures are independently in a range bounded at the lower end by a temperature of about 450° C., about 500° C., about 550° C., about 600° C., about 650° C., about 700° C., or about 750° C., and at upper end by a temperature of about 1250° C., about 1200° C., about 1150° C., about 1100° C., about 1050° C., about 1000° C., about 950° C., about 900° C., or about 850° C. Specific non-limiting exemplary ranges include a range of from about 750° C. to about 850° C. for the first temperature and a range of from about 550° C. to about 850° C. (for a manganese system) or about from about 550° C. to about 1120° C. (for an iron system) for the third temperature. In some embodiments with a manganese system, both first and third temperatures are about 850° C. In some embodiments with an iron system, the first temperature is about 850° C. and the third temperature is about 1150° C.

Certain embodiments provide that the second temperature may be below about 100° C., about 100° C., or in a range of from about 100° C. to about 250° C., provided that the conditions allow for the presence of liquid water and the dissolution of the $CO_2$ therein. Without intending to be bound by any particular theory, it appears that the water intercalate between the metal oxide sheets of the alkali metal ion-transition metal oxide, expanding the distance between the adjacent layers, and improving the mobility of the alkali metal ions. The presence of the $CO_2$ in the water reacts to form carbonic acid whose protons replace the alkali metal ions, maintaining the oxidation state of the ion extracted-transition metal oxide. This may be accomplished at ambient atmospheric pressures below about 100° C., for examples in a temperature in a range of from about 60° C. to about 95° C., preferably about 80° C., by bubbling $CO_2$ into the water. It may also be accomplished at a temperature in a range of from about 100° C. to about 250° C., or even higher, provided the temperature is kept below the critical temperatures of water, and where the $CO_2$ is present at a partial pressure in a range of from about 1 bar to about 25 bar. The balance of temperature and pressure may be adjusted to provide for kinetic advantages. In experiments described in Example 8, it has been shown that temperatures in a range of about 120° C. to about 160° C., with suitable $CO_2$ partial pressures, may represent useful embodiments.

Certain specific embodiments provide for method of splitting water into $H_2$ and $O_2$ based on a spinel-type metal oxide system, including iron and manganese oxides, preferably based on manganese, using a multistep, low-temperature water splitting cycle that can be operated within a temperature regime about or less than about 850° C. In the case of one exemplary, non-limiting manganese system, the thermochemical cycle can be envisioned as consisting of, consisting essentially of, or comprising four main steps (FIG. 2):

(i) thermal treatment of a physical mixture of $Na_2CO_3$ and the spinel $Mn_3O_4$ to produce MnO, $CO_2$, and the layered compound, α-NaMnO$_2$ at about 850° C.;

(ii) oxidation of MnO in the presence of $Na_2CO_3$ by water to produce $H_2$, $CO_2$, and α-NaMnO$_2$ at about 850° C.;

(iii) Na$^+$ extraction from α-NaMnO$_2$ by suspension in aqueous solutions in the presence of bubbling $CO_2$ at about 80° C.; and (iv) recovery of $Mn_3O_4$ by thermally reducing the sodium ion extracted solid produced in step (iii) at about 850° C. Other variations on this theme, including combining steps and using different temperatures, extraction methods, and metal oxides are also available, as described below. The net reaction is the stoichiometric splitting of water to hydrogen and oxygen without any by-product. Without being bound by the correctness of any particular theory, it appears that the incorporation and extraction of Na$^+$ into and out of the manganese oxides are the critical steps in lowering the temperature required for both the hydrogen evolution and the thermal reduction steps.

The invention, then, teaches methods where the embodiments comprise compounds based on manganese oxide complexes; for example, wherein the transition metal comprises manganese; the carbonate, bicarbonate, or mixture thereof comprises a carbonate; and the alkali metal ion comprises sodium ion. Additional independent embodiments include those wherein the alkali metal ion-stabilized oxidized-transition metal oxide comprises a composition having an empirical formula of NaMnO$_2$, formed by reactions resulting from contacting sodium carbonate and $Mn_3O_4$. In some of these embodiments, contacting sodium carbonate and $Mn_3O_4$ reacts according to the following stoichiometries:

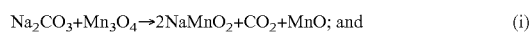

$Na_2CO_3 + Mn_3O_4 \rightarrow 2NaMnO_2 + CO_2 + MnO$; and (i)

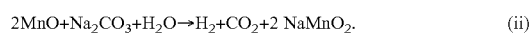

$2MnO + Na_2CO_3 + H_2O \rightarrow H_2 + CO_2 + 2\,NaMnO_2$. (ii)

As discussed above, the hydrogen generation reactions may be conducted in the presence of water, or in the sequential absence and presence of water. For example, the $Mn_3O_4$ may react with $Na_2CO_3$ in the absence of water, forming NaMnO$_2$ and MnO; in which the Mn(III) species is extracted from $Mn_3O_4$ through the reaction with $Na_2CO_3$, leaving the Mn(II) species in the form of MnO:

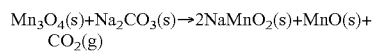

$Mn_3O_4(s) + Na_2CO_3(s) \rightarrow 2NaMnO_2(s) + MnO(s) + CO_2(g)$ followed by the oxidation of Mn(II) oxide by water in the presence of $Na_2CO_3$, producing hydrogen and NaMnO$_2$:

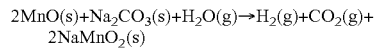

$2MnO(s) + Na_2CO_3(s) + H_2O(g) \rightarrow H_2(g) + CO_2(g) + 2NaMnO_2(s)$

Generally, under these conditions, the NaMnO$_2$ is in the form of α-NaMnO$_2$.

For these manganese systems, certain embodiments provide that the "cation extraction step" is described in the following terms: the Mn(III) species in α-NaMnO$_2$ cannot be thermally reduced below 1000° C., whereas the transition from Mn(III) and Mn(IV) oxides to $Mn_3O_4$ occurred below 850° C. Therefore, the sodium cations are suitably removed from the manganese oxide in order to close the thermochemical cycle below 1000° C. The sodium cations in α-NaMnO$_2$ may be substituted with protons by suspending the α-NaMnO$_2$ in water or impregnated the α-NaMnO$_2$ with water, each in the presence of $CO_2$. As discussed above, this may be suitably done below or above 100° C., provided liquid water is present and $CO_2$ is dissolved therein. Without being bound by any particular theory, it appears that water molecules intercalate into the manganese oxide layers, increasing the distance between the layers and mobilizing sodium cations. Protons from carbonic acid, formed via the reaction of $CO_2$ and water, can exchange with the sodium cations between manganese oxide layers. When $CO_2$, and in turn protons, are in excess, almost all sodium cations can be removed from the manganese oxide structure. A disproportionation reaction may accompany the ion exchange process:

$$2Mn(III)(s) \rightarrow Mn(IV)(s) + Mn(II)(s)$$

All Mn(IV) and the majority of Mn(III) species may be provided in a proton exchanged birnessite phase. A fraction of the Mn(II) and the remainder of the Mn(III) may be present in an amorphous $Mn_3O_4$ phase, while the rest of Mn(II) species exists in the form of $MnCO_3$. Since no net oxidation or reduction reaction occurs during the ion exchange process, the average oxidation state of the Mn remains +3.

Accordingly, in certain embodiments, the alkali metal ion transition metal oxide comprises a composition having a stoichiometry of $NaMnO_2$ and the extraction of the $Na^+$ from the $NaMnO_2$ is characterized by a stoichiometry:

$$6NaMnO_2 + ay\ H_2O + (3+b)CO_2 \rightarrow 3Na_2CO_3 + H_xMnO_2 \cdot yH_2O + b\ MnCO_3 + c\ Mn_3O_4; \quad (iii)$$

wherein $a+b+3c=6$ and $(4-x)\cdot a+2b+8c=18$.

In specific embodiments, the transition metal composition of step (b) comprises a protonic birnessite, and the thermochemical reduction of this product is done at the third temperature in a range of from about 750° C. to about 850° C. In this case, step (c) of the method may be characterized by a stoichiometry:

$$a\ H_xMnO_2 \cdot yH_2O + b\ MnCO_3 \rightarrow (2-c)Mn_3O_4 + ay\ H_2O + b\ CO_2 + 0.5\ O_2; \quad (iv)$$

wherein $a+b+3c=6$ and $(4-x)\cdot a+2b+8c=18$.

That is, the solid mixture collected after the sodium cation extraction may be heated to a temperature in a range of from about 750° C. to about 850° C., preferably about 850° C., under inert atmosphere (e.g., Ar or $N_2$). Note that higher temperatures may also be employed (e.g., upwards of 1250° C.), but for reasons described above, the lower temperatures are preferred. Under these conditions, the thermochemical reduction restores the manganese oxides to the spinel-type $Mn_3O_4$ phase (with the release of $CO_2$ and $O_2$ in the process), that can be used in the next cycle.

Other specific embodiments also provide methods of thermochemically forming $H_2$, $O_2$, or a combination thereof from water, under catalytic conditions, each method comprising: (a) contacting a composition comprising a spinel-type $Mn_3O_4$ with sodium carbonate in the presence of $H_2O$ at a first temperature in a range of from about 550° C. to about 900° C., preferably about 850° C., to form $H_2$, $CO_2$, and a sodium birnessite-type $A_xMnO_2$ ($0<x<1$), preferably derived from $\alpha$-$NaMnO_2$, the sodium birnessite-type manganese dioxide having an average transition metal oxidation state that is higher than the average oxidation state of the transition metal in the spinel-type $Mn_3O_4$; (b) hydrolytically extracting at least a portion of sodium cations from the sodium birnessite-type manganese dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising an protonic birnessite in which the average oxidation state of the transition metal in the protonic birnessite is the same as the average oxidation state of the transition metal in the sodium birnessite-type manganese dioxide; and (c) thermochemically reducing the transition metal composition of step (b) at a third temperature in a range of from about 550° C. to about 900° C., preferably about 850° C., with the associated formation of $O_2$.

The methods of splitting water may also use iron oxides, and certain embodiments provide that such methods include the use of spinel type $Fe_3O_4$; the carbonate, bicarbonate, or mixture thereof comprises a carbonate; and the alkali metal ion comprises sodium ion, potassium ion, or a combination thereof. In some of these embodiments, the alkali metal ion-transition metal oxide is $NaFeO_2$ or $KFeO_2$, formed by the reactions between $Fe_3O_4$ and sodium carbonate and between $Fe_3O_4$ and potassium carbonate, respectively. Similarly, still other embodiments include those where the alkali metal ion is $Na^+$ or $K^+$ or a combination thereof, and the alkali metal ion-transition metal oxide comprises a composition having a stoichiometry of $NaFeO_2$ or $KFeO_2$.

Other specific embodiments also provide methods of thermochemically forming $H_2$, $O_2$, or a combination thereof from water, under catalytic conditions, each method comprising: (a) contacting a composition comprising a spinel-type $Fe_3O_4$ with sodium or potassium carbonate, or a mixture thereof, in the presence of $H_2O$ at a first temperature in a range of from about 550° C. to about 900° C., preferably about 850° C., to form $H_2$, $CO_2$, and a sodium- or potassium-type $A_xFeO_2$ ($0<x<1$), preferably $NaFeO_2$ or $KFeO_2$, the sodium- or potassium-type iron dioxide having an average transition metal oxidation state that is higher than the average oxidation state of the transition metal in the spinel-type $Fe_3O_4$; (b) hydrolytically extracting at least a portion of sodium cations from the sodium- or potassium-type iron dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising $Fe_2O_3$ or a hydrated form thereof, in which the average oxidation state of the transition metal is the same as the average oxidation state of the transition metal in the $Fe_2O_3$ or a hydrated form thereof; and (c) thermochemically reducing the transition metal composition of step (b) at a third temperature in a range of from about 1150° C. to about 1250° C., with the associated formation of $O_2$.

It has also been discovered that certain spinel-type transition metal oxides, including $Fe_3O_4$, when reacted with an alkali metal carbonate, bicarbonate, or mixture thereof in the absence of $H_2O$ at a first temperature in a range of from about 450° C. to about 1000° C. (or to about 950° C., to about 900° C., or to about 850° C.) to form CO, and an alkali metal ion-transition metal oxide, said alkali metal ion-transition metal oxide having an average transition metal oxidation state that is higher than the average oxidation state of the transition metal in the spinel-type transition metal oxide. That is, instead of reducing the protons in water to form $H_2$, the reaction proceeds to reduce $CO_2$ to CO. See, e.g., Example 10, described herein. Once formed, certain of these reaction products, e.g., $NaFeO_2$ or $KFeO_2$, may be subjected to the same hydrolytic extraction and follow-up thermochemical reduction procedures otherwise described herein, resulting in a method for the catalytic reduction of carbon dioxide, according to:

$$CO_2 \rightarrow CO + \tfrac{1}{2}O_2$$

with an associated exemplary transition metal cycle comprising:

$$2Fe_3O_4 + 3Na_2CO_3 \rightarrow 6NaFeO_2 + CO + 2CO_2$$

$$2NaFeO_2 + 2\ H^+ \rightarrow Fe_2O_3 + 2Na^+ + H_2O$$

$$3Fe_2O_3 \rightarrow 2Fe_3O_4 + \tfrac{1}{2}O_2$$

Exemplary methods for the catalytic reduction of carbon dioxide include those where method comprises: (a) contacting a composition comprising a spinel-type transition metal oxide of formula $M_3O_4$ with an alkali metal carbonate, bicarbonate, or mixture thereof in the absence of $H_2O$ at a first temperature in a range of from about 450° C. to about 1000° C. (or up to about 950° C., up to about 900° C., or up to about 850° C.) to form CO, and an alkali metal ion-transition metal oxide, said alkali metal ion-transition metal oxide having an average transition metal oxidation state that is higher than the average oxidation state of the transition metal in the spinel-type transition metal oxide; (b) hydrolytically extracting at least a portion of alkali metal ions from the alkali metal ion-transition metal oxide by the reaction with $CO_2$ and liquid $H_2O$ at a second temperature in a range of from about 60° C. to about 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion -transition metal oxide; and (c) thermochemically reducing the transition metal composition of step (b) at a third temperature in a range of from about 450° C. to about 1250° C., preferably in a range of about 1150° C. to about 1200° C., with the associated formation of $O_2$. In particular of these embodiments, the transition metal, M, comprises iron; the corresponding spinel-type transition metal oxide comprises $Fe_3O_4$; and the alkali metal ion comprises sodium ion, potassium ion, or a combination thereof. In other particular embodiments, the carbonate, bicarbonate, or mixture thereof comprises a carbonate and the oxidized ion extracted-transition metal oxide of step (b) comprises $Fe_2O_3$.

Each of the catalytic systems is robust over repetitive cycles. Accordingly, independent embodiments of the present invention include those where steps (a) then (b) then (c) of the methods described herein are performed in order at least 5 times, at least 10 times, at least 50 times, or at least 100 times, with less than 10%, less than 5%, or practically no loss of activity, relative to their initial activities.

The following listing of embodiments in intended to complement, rather than displace or supersede, any of the previous descriptions.

Item 1. A method of thermochemically forming $H_2$, $O_2$, or a combination thereof from water, said method comprising: (a) contacting a composition comprising a spinel-type transition metal oxide of formula $M_3O_4$ with an alkali metal carbonate, bicarbonate, or mixture thereof in the presence of $H_2O$ at a first temperature in a range of from about 450° C. to about 1000° C. (<950, 900, 850° C.) to form $H_2$, $CO_2$, and an alkali metal ion-transition metal oxide, said alkali metal ion-transition metal oxide having an average transition metal oxidation state that is higher than the average oxidation state of the transition metal in the spinel-type transition metal oxide; (b) hydrolytically extracting at least a portion of alkali metal ions from the alkali metal ion-transition metal oxide by the reaction with $CO_2$ and liquid $H_2O$ at a second temperature in a range of from about 60° C. to about 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion -transition metal oxide; and (c) thermochemically reducing the transition metal composition of step (b) at a third temperature in a range of from about 450° C. to about 1150° C., with the associated formation of $O_2$; wherein the transition metal, M, comprises iron, manganese, or a combination thereof, and the corresponding spinel-type transition metal oxide comprises $Fe_3O_4$, $Mn_3O_4$, or a solid solution or physical mixture thereof (preferably manganese and $Mn_3O_4$); and wherein the alkali metal ion comprises sodium ion, potassium ion, or a combination thereof.

Item 2. The method of item 1, wherein the step (a) of contacting the composition comprising a spinel-type transition metal oxide of formula $M_3O_4$ with an alkali metal carbonate, bicarbonate, or mixture thereof is done stepwise first in the absence and then in the presence of $H_2O$.

Item 3. The method of item 1 or 2, wherein the carbonate, bicarbonate, or mixture thereof comprises a carbonate.

Item 4. The method of any of the preceding items, wherein the alkali metal ion-transition metal oxide comprises a composition having an empirical formula $AMO_2$, where A represents the alkali metal ion.

Item 5. The method of any one of the preceding items, wherein at least one of the first and third temperatures is in a range of from about 750° C. to about 850° C.

Item 6. The method of item 1, wherein the second temperature is (1) in a range of from about 60° C. to about 95° C., preferably about 80° C., at ambient atmospheric pressure or (2) in a range of from about 100° C. to about 250° C., wherein the $CO_2$ is present at a partial pressure in a range of from about 1 bar to about 25 bar.

Item 7. The method of any one of the preceding items, wherein the third temperature is in a range of from about 550° C. to about 1150° C.

Item 8. The method of any one of the preceding items, wherein the thermochemical reduction of the oxidized-transition metal oxide results in a regeneration of the spinel-type transition metal oxide of (a).

Item 9. The method of any of the preceding items, wherein the transition metal comprises manganese; the carbonate, bicarbonate, or mixture thereof comprises a carbonate; and the alkali metal ion comprises sodium ion.

Item 10. The method of item 9, wherein the alkali metal ion-stabilized oxidized-transition metal oxide comprises a composition having an empirical formula of $NaMnO_2$, formed by at least one reaction resulting from contacting sodium carbonate and $Mn_3O_4$.

Item 11. The method of item 10, wherein the at least one reaction resulting from contacting sodium carbonate and $Mn_3O_4$ is according to the stoichiometries:

$$Na_2CO_3 + Mn_3O_4 \rightarrow 2NaMnO_2 + CO_2 + MnO; \text{ and} \quad (i)$$

$$2MnO + Na_2CO_3 + H_2O \rightarrow H_2 + CO_2 + 2NaMnO_2. \quad (ii)$$

Item 12. The method of any of the preceding items, wherein the alkali metal ion-stabilized oxidized-transition metal oxide comprises α-$NaMnO_2$.

Item 13. The method of any one of the preceding items, wherein the alkali metal ion is $Na^+$ and the alkali metal ion transition metal oxide comprises a composition having an empirical formula $NaMnO_2$.

Item 14. The method of item 13, wherein the alkali metal ion transition metal oxide comprises a composition having a stoichiometry of $NaMnO_2$ and the extraction of the $Na^+$ from the $NaMnO_2$ is characterized by a stoichiometry:

$$6NaMnO_2 + ay\, H_2O + (3+b)CO_2 \rightarrow 3Na_2CO_3 + \\ H_xMnO_2 \cdot yH_2O + bMnCO_3 + c\, Mn_3O_4; \quad (iii)$$

wherein $a+b+3c=6$ and $(4-x) \cdot a + 2b + 8c = 18$.

Item 15. The method of any one of the preceding items, wherein the transition metal composition of step (b) comprises a protonic birnessite, and the thermochemical reduction of the this product is done at the third temperature in a range of from about 750° C. to about 850° C.

Item 16. The method of item 15, wherein (c) is characterized by a stoichiometry:

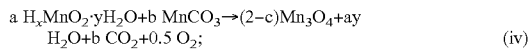

$$a\ H_xMnO_2 \cdot yH_2O + b\ MnCO_3 \rightarrow (2-c)Mn_3O_4 + ay\ H_2O + b\ CO_2 + 0.5\ O_2; \qquad (iv)$$

wherein a+b+3c=6 and (4−x)·a+2b+8c=18.

Item 17. The method of any of the preceding items, said method comprising: (a) contacting a composition comprising a spinel-type $Mn_3O_4$ with sodium carbonate in the presence of $H_2O$ at a first temperature in a range of from about 550° C. to about 900° C., preferably about 850° C., to form $H_2$, $CO_2$, and a sodium birnessite-type $A_xMnO_2(0<x<1)$, preferably derived from α-$NaMnO_2$, the sodium birnessite-type manganese dioxide having an average transition metal oxidation state that is higher than the average oxidation state of the transition metal in the spinel-type $Mn_3O_4$; (b) hydrolytically extracting at least a portion of sodium cations from the sodium birnessite-type manganese dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising an protonic birnessite in which the average oxidation state of the transition metal in the protonic birnessite is the same as the average oxidation state of the transition metal in the sodium birnessite-type manganese dioxide; and (c) thermochemically reducing the transition metal composition of step (b) at a third temperature in a range of from about 550° C. to about 900° C., preferably about 850° C., with the associated formation of $O_2$.

Item 18. The method of any one of items 1 to 8, wherein the transition metal comprises iron; the carbonate, bicarbonate, or mixture thereof comprises a carbonate; and the alkali metal ion comprises sodium ion, potassium ion, or a combination thereof.

Item 19. The method of any one of items 1 to 8 or 18, wherein the alkali metal ion-transition metal oxide is $NaFeO_2$ or $KFeO_2$, formed by the reactions between $Fe_3O_4$ and sodium carbonate or between $Fe_3O_4$ and potassium carbonate, respectively.

Item 20. The method of any one of items 1 to 8, 18, or 19, wherein the alkali metal ion is $Na^+$ or $K^+$ or a combination thereof, and the alkali metal ion-transition metal oxide comprises a composition having a stoichiometry of $NaFeO_2$ or $KFeO_2$.

Item 21. The method of any one of items 1 to 8 or 18 to 20, said method comprising : (a) contacting a composition comprising a spinel-type $Fe_3O_4$ with sodium or potassium carbonate, or a mixture thereof, in the presence of $H_2O$ at a first temperature in a range of from about 550° C. to about 900° C., preferably about 850° C., to form $H_2$, $CO_2$, and a sodium-type $A_xFeO_2(0<x<1)$, preferably $NaFeO_2$ or $KFeO_2$ the sodium- or potassium-type iron dioxide having an average transition metal oxidation state that is higher than the average oxidation state of the transition metal in the spinel-type $Fe_3O_4$; (b) hydrolytically extracting at least a portion of sodium or potassium cations from the sodium- or potassium-type iron dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising $Fe_2O_3$ or a hydrated form thereof, in which the average oxidation state of the transition metal is the same as the average oxidation state of the transition metal in the $Fe_2O_3$ or a hydrated form thereof; and (c) thermochemically reducing the transition metal composition of step (b) at a third temperature in a range of from about 1150° C. to about 1250° C., with the associated formation of $O_2$.

Item 22. A method of catalytically reducing carbon dioxide, said method comprising: (a') contacting a composition comprising a spinel-type transition metal oxide of formula $M_3O_4$ with an alkali metal carbonate, bicarbonate, or mixture thereof in the absence of $H_2O$ at a first temperature in a range of from about 450° C. to about 1000° C. (preferably to about 950° C., to about 900° C., or to about 850° C.) to form CO, and an alkali metal ion-transition metal oxide, said alkali metal ion-transition metal oxide having an average transition metal oxidation state that is higher than the average oxidation state of the transition metal in the spinel-type transition metal oxide; (b') hydrolytically extracting at least a portion of alkali metal ions from the alkali metal ion-transition metal oxide by the reaction with $CO_2$ and liquid $H_2O$ at a second temperature in a range of from about 60° C. to about 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion -transition metal oxide; and (c') thermochemically reducing the transition metal composition of step (b') at a third temperature in a range of from about 450° C. to about 1250° C., with the associated formation of $O_2$; wherein the transition metal, M, comprises iron, and the corresponding spinel-type transition metal oxide comprises $Fe_3O_4$; and wherein the alkali metal ion comprises sodium ion, potassium ion, or a combination thereof.

Item 23. The method of item 22, wherein the carbonate, bicarbonate, or mixture thereof comprises a carbonate and the oxidized ion extracted-transition metal oxide of step (b) comprises $Fe_2O_3$.

Item 24. The method of item 22, wherein the third temperature is about 1150° C.

Item 25. A catalytic cycle comprising the method of any of the preceding items, the steps being performed in order (a/a') then (b/b') then (c/c') at least 5 times, or at least 10 times, at least 50 times, or at least 100 times.

EXAMPLES

The following Examples are provided to illustrate some of the concepts described within this disclosure. While each Example is considered to provide a specific individual embodiment of composition, or methods of preparation and use, none of the Examples should be considered to limit the more general embodiments described herein.

Example 1

Materials Preparation. $Co_3O_4$ (99.5%), $Fe_3O_4$ (95%), $Mn_2O_3$ (99%), $Mn_3O_4$ (97%), $Li_2CO_3$ (99%), $Na_2CO_3$ (99.5%), and $K_2CO_3$ (99%) were purchased from Aldrich and used without further treatment. $Na_2^{13}CO_3$ (99% $^{13}$C) was purchased from Cambridge Isotope Laboratories and used without further treatment. The mixture of spinel-type metal oxides ($Co_3O_4$ $Fe_3O_4$ or $Mn_3O_4$) and alkali metal carbonate ($Li_2CO_3$, $Na_2CO_3$, or $K_2CO_3$) with a molar ratio of 2:3 for the hydrogen evolution step was prepared by mixing these two powders in an agate mortar under ambient condition. In some experiments, the alkali metal ions were extracted from the respective alkali metal oxides by bubbling $CO_2$ (99.997%, 10 cc/min) through an aqueous suspension of the powder (approximately 5 wt % of solid) for 3 h at 80° C. In other experiments, sodium ions were extracted at elevated temperatures and pressures using steel Paar autoclaves, using a reactor configuration as shown in FIG. 9 (see Example 8 below). Hydrothermal treatment of α-NaMnO$_2$ was carried out in an autoclave at 140° C. for 5 h with the mass ratio of α-NaMnO$_2$/H$_2$O/CO$_2$ (dry ice) being roughly 1/10/10. The compound α-NaMnO$_2$ was placed on a small vessel in the autoclave to avoid direct contact with liquid water. The powder for the oxygen evolution step was obtained by separating the solid by centrifugation and drying at 100° C. in air.

Example 2

Reaction Tests. All powders (approximately 200 mg) were pelletized (20-35 mesh) before being introduced to a quartz reaction tube with an alumina sheath. The pellets were supported between two layers of alumina sand (16 mesh) to avoid contact with the quartz tube. Hydrogen and oxygen evolution steps were tested using an Altamira flow reaction system (AMI-200), and the effluent gas stream was monitored by an on-line mass spectrometer (Dymaxion 2000). Under typical flow conditions, the flow rate of the gas was 50 cc/min. Depending on the experiments, the gases used were Ar (99.999%), CO$_2$/Ar (2%/98%) or D$_2$O/Ar (5%/95%). In one exemplary hydrogen evolution step, the mixture (Mn$_3$O$_4$/Na$_2$CO$_3$) was heated from room temperature to 850° C. at a ramp rate of 20° C./min under Ar (99.999%, 50 cc/min) before water (D$_2$O) vapor was introduced. Water (D$_2$O) vapor was introduced by flowing the carrier gas through a bubbler (50 cc/min) with D$_2$O at room temperature. D$_2$O was used instead of H$_2$O to obtain a better signal-to-noise ratio of the signal in the water splitting step (m/z=4 for D$_2$ instead of m/z=2 for H$_2$). Oxides recovered from the CO$_2$ treatment were heated up at a ramp rate of 20° C./min from room temperature to 850° C. in Ar atmosphere.

The conditions for water pulse experiments were similar to the flow reactions described above, apart from pulse introduction of D$_2$O to the gas stream for 2-15 minutes at the desired sample temperature. The reduction of the ion-extracted oxides was carried out under a 50 cc/min flow of Ar with a temperature ramp from room temperature to 850-1150° C. at 20° C/min.

Example 3

Characterization. Powder X-ray diffraction (XRD) patterns were collected using a Rigaku Miniflex II diffractometer using Cu Kα radiation.

Example 4

Figure 1A:
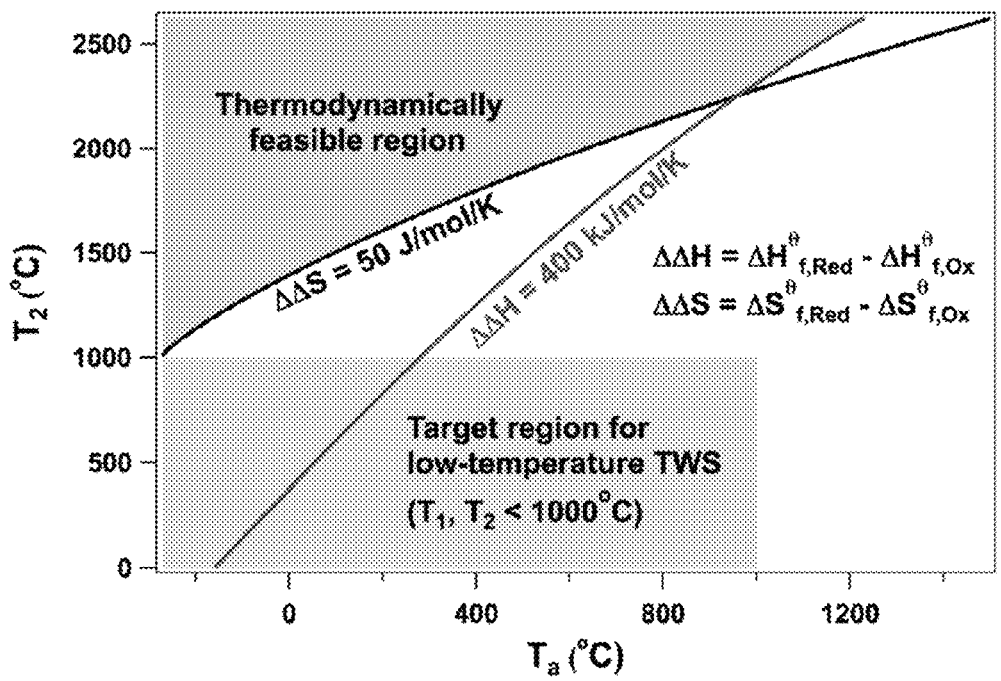
FIG. 1(A) shows the isenthalpic and isentropic lines relating the temperature of the hydrogen.
Figure 1B:
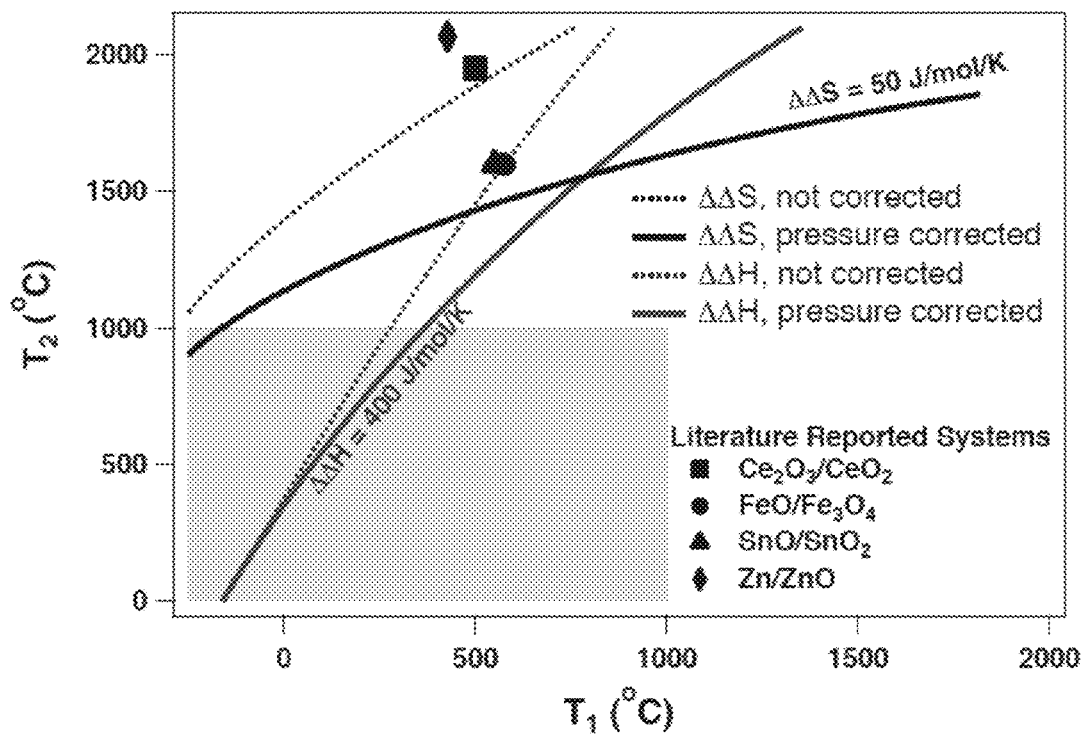
FIG. 1(B) shows the isenthalpic and isentropic lines relating the temperature of the hydrogen generating step and the thermal reduction step with pressure corrections. Partial pressure of water was set at the saturation vapor pressure at 60° C. (ca. 0.2 atm) and the partial pressure of hydrogen was lower than that of water by a factor of 100. The partial pressure of oxygen in the thermal reduction step was set at 1/100 of the reference pressure generating step and the thermal reduction step.

Thermodynamic Considerations: The general thermodynamic considerations for a thermochemical cycle comprising two step are shown in FIG. 1(A) and (B) for the (i) oxidation of a metal or metal oxide, referred to as Red by water to its oxidized state, referred to as Ox, with the metal at a higher oxidation state; and (ii) thermal reduction of the Ox phase back to the Red phase, accompanied by the release of oxygen, according to:

T1 Red+H$_2$O→Ox+H$_2$      [1]

T2 Ox→Red+0.5 O$_2$      [2]

where T1 and T2 are the reaction temperatures where ΔG=0 for Eqs. 1 and 2, respectively. From the changes in the Gibbs free energy, ΔG$_r$=ΔH$_r$-TΔS, expressions relating T1 to T2 with either (ΔH$_{f,Red}^o$-ΔH$_{f,Ox}^o$) or (ΔS$_{f,Red}^o$-ΔS$_{f,Ox}^o$) held constant (isenthalpic or isentropic, respectively) can be obtained. These FIGS. 1(A) and (B) demonstrated that it is unlikely, if not impossible, to split water with a two-step cycle where there is complete conversion between the oxidized and reduced forms at below 1,000° C. Typical differences in the formation enthalpy (ΔΔH) and entropy (ΔΔS) of the Red and Ox phases for metal/oxide systems were found to be below 400 kJ/mol and 50 J/mol/K, respectively (conservative upper bounds). Therefore, only the region above both the lower ΔΔS (entropic) and ΔΔH (enthalpic) lines in FIG. 1(A) (i.e., the upper shaded area labeled "Thermodynamically feasible reason") was deemed to have practical relevance, as it is only in this region that both thermodynamic criteria are satisfied. The target region for low-temperature thermal water splitting (lower shaded area, T1, T2<1,000° C.) had no overlap with the practically accessible region when using a two-step process. Additionally, existing two-step thermochemical water splitting cycles that have been reported previously all operate at above 1,000° C. The conclusion that was derived from these results was that thermochemical water splitting cycles accomplished below 1,000° C. would require more than two steps.

Example 5

Figure 2:
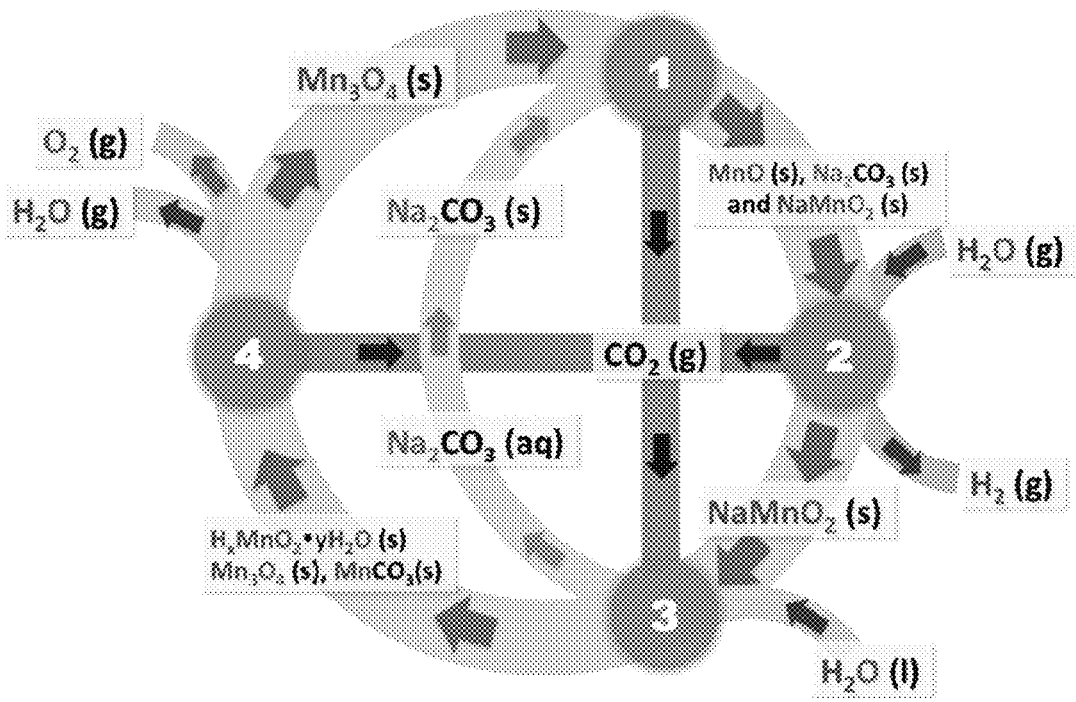
FIG. 2 is a schematic representation of a low-temperature, Mn-based thermochemical cycle. In the cycle.
Figure 3A:
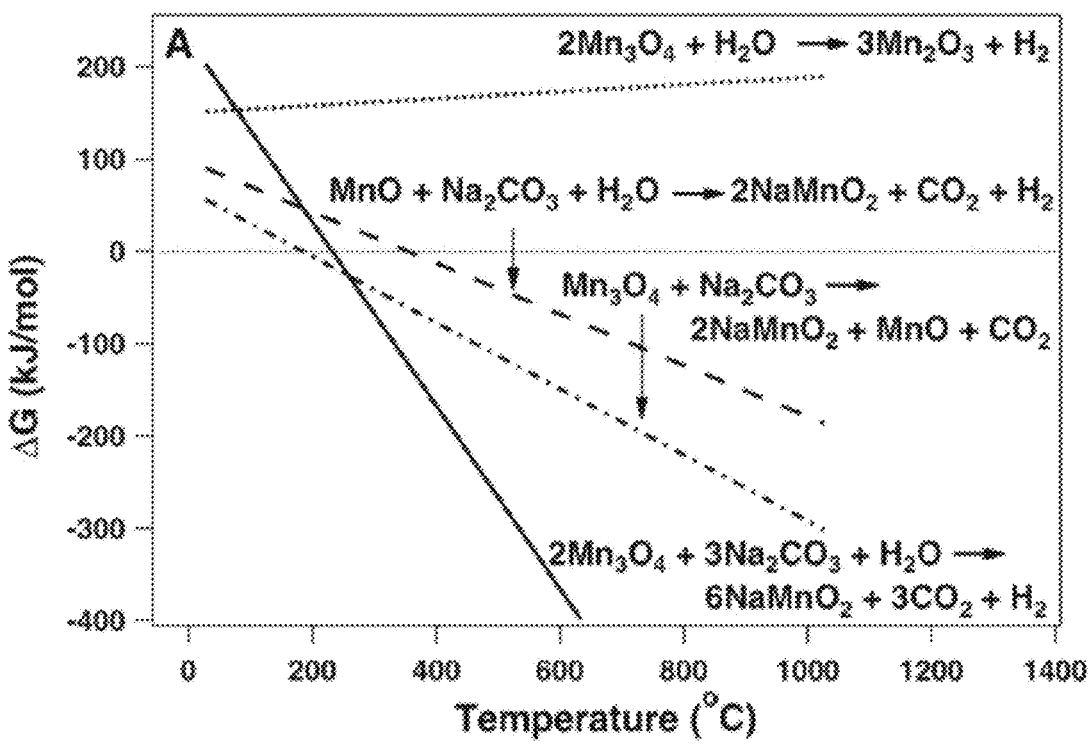
Figure 3B:
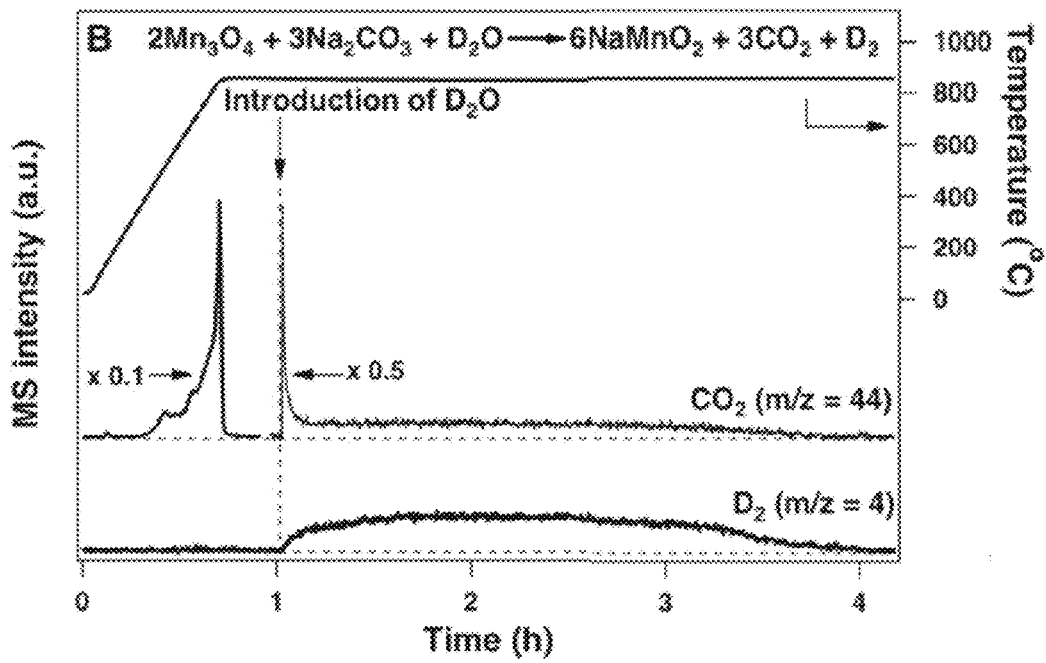
Figure 3C:
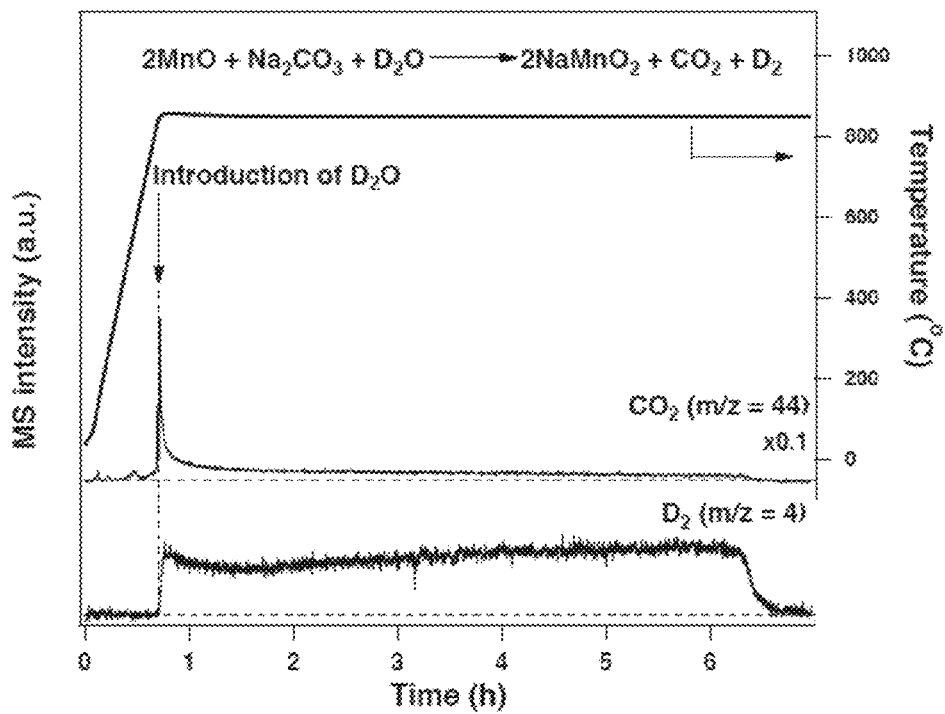
Figure 3D:
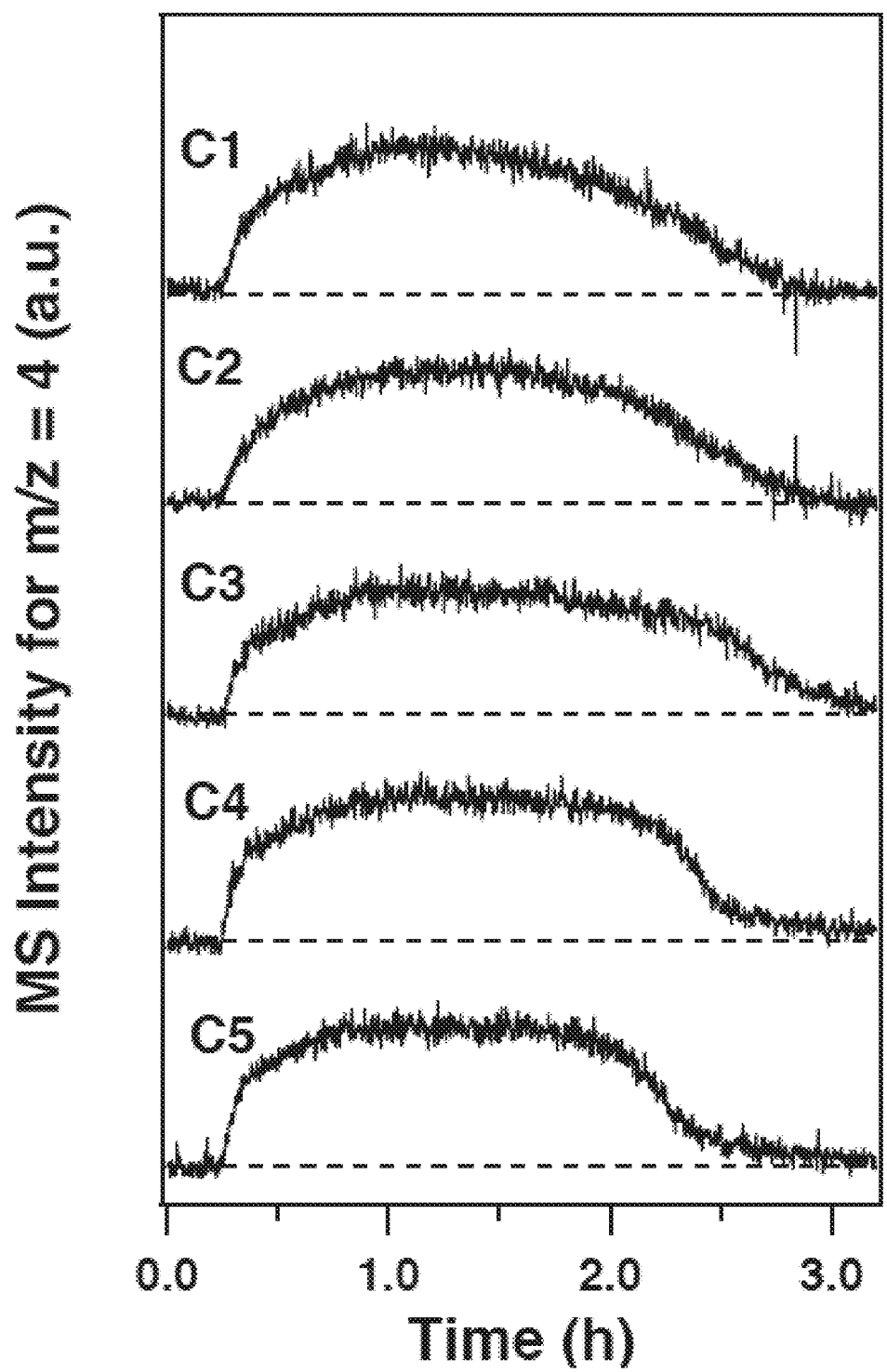

Steps 1 and 2: Hydrogen evolution on Mn$_3$O$_4$/Na$_2$CO$_3$. The presence of Na$^+$ enabled the oxidation of Mn$^{2+}$ in Mn$_3$O$_4$ to Mn$^{3+}$ by water, leading to the formation of α-NaMnO$_2$, CO$_2$, and H$_2$. In the absence of Na$_2$CO$_3$, oxidation of Mn$_3$O$_4$ to Mn$_2$O$_3$ was always thermodynamically unfavorable (ΔG>0) (FIG. 3A, top dotted line). The introduction of Na$_2$CO$_3$ drastically changed the thermodynamics of the oxidation reaction; the ΔG of the reaction decreased with increasing temperature and became negative around 250° C. (FIG. 3A, solid line). These thermodynamic estimates were consistent with the experimental observations made in the present work in that water did not react with Mn$_3$O$_4$ in the absence of Na$_2$CO$_3$ at 850° C., and the amount of D$_2$ obtained by reacting D$_2$O (D$_2$O is used instead of H$_2$O to enhance the signal-to-noise ratio in the product detection and quantification) with the Mn$_3$O$_4$/Na$_2$CO$_3$ mixture at 850° C. was equivalent to the amount that would be expected when Mn$^{2+}$ was totally converted into Mn$^{3+}$ (FIG. 3B). Without being necessarily bound by the correctness of any particular theory, it was hypothesized that Na$_2$CO$_3$ extracted the Mn$^{3+}$ from Mn$_3$O$_4$ at 500-850° C. to form α-NaMnO$_2$, CO$_2$, and MnO [FIG. 2, step 1; note that CO$_2$ was observed while heating the Mn$_3$O$_4$/Na$_2$CO$_3$ mixture prior to exposure of water (FIG. 3B)]. Hydrogen was then formed from the water oxidation of MnO at 850° C. in the presence of Na$_2$CO$_3$ (FIG. 2, step 2). The present work confirmed that this step could occur independently at 850° C. (FIG. 3C). The ΔG for both steps decreases with increasing temperature and became energetically favorable above 400° C. (FIG. 3A). Upon the introduction of D$_2$O, a sharp peak indicating the release of CO$_2$ was observed. In contrast, the rate of D$_2$ evolution increased slowly after the D$_2$O introduction, and reached a plateau after approximately 30 min (FIG. 3D shows reproducibility). The drastically different kinetics for the evolution of CO$_2$ and D$_2$ suggested that step 2 was not an elementary step. The stoichiometry of the proposed reaction predicted that two-thirds of the α-NaMnO$_2$ and CO$_2$ should be formed via step 1 and the remaining third via step 2. These amounts were experimentally confirmed by the 2:1 (±15%) ratio of the amount of CO$_2$ evolved before and after the introduction of D$_2$O (FIG. 3B). Further support for this reaction pathway was provided by the identification of the reaction intermediate MnO by powder X-ray diffraction (XRD) measurements. The XRD pattern of the solid obtained after the hydrogen evolution reaction (FIG. 2, steps 1 and 2) contained α-NaMnO$_2$ and a hydrated product α-Na$_{0.7}$MnO$_{2.14}$ [FIG. 4, i; α-NaMnO$_2$ can form α-Na$_{0.7}$MnO$_{2.14}$ when exposed to water]. Importantly, the XRD pattern of the powder collected after step 1 clearly showed the presence of MnO in addition to the peaks attributed to α-NaMnO$_2$ and α-Na$_{0.7}$MnO$_{2.14}$ (FIG. 4, ii). The diffraction peaks corresponding to MnO persisted after α-NaMnO$_2$ was fully hydrolyzed in the presence of CO$_2$ (FIG. 4, iii); the hydrolysis process of α-NaMnO$_2$ is discussed further below). Furthermore, after annealing the hydrolyzed sample at 180° C. in Ar, the only sharp peaks were those from MnO (FIG. 4, iv). The identification of the reaction intermediate MnO strongly supported the proposed reaction pathway.

Example 6

Step 3: Na$^+$ extraction of α-NaMnO$_2$. Na$^+$ could be efficiently extracted from α-NaMnO$_2$ via hydrolysis in the presence of CO$_2$. Na$^+$ extraction was a critical step in closing the low-temperature thermochemical cycle, since α-NaMnO$_2$ cannot be thermally reduced below 1,000° C. The compound α-NaMnO$_2$ is layered, with Na$^+$ sandwiched between MnO$_6$ octahedral sheets. Water can intercalate into these sheets, expanding the distance between adjacent layers to form sodium birnessite (FIG. 5), as evidenced by the disappearance of the diffraction peak at 16.7° in α-NaMnO$_2$ and the appearance of the 12.5° peak in birnessite (FIG. 5, i). The mobility of Na$^+$ was greatly enhanced in birnessite compared to that in α-NaMnO$_2$ presumably because the MnO$_6$ sheets are pillared by water, and therefore could easily be exchanged by other cations including protons. Complete Na$^+$ extraction from α-NaMnO$_2$ by hydrolysis in acidic conditions to form protonic birnessite (H$^+$ birnessite) has been reported. See, e.g., Omomo Y., et al., "Preparation of protonic layered manganates and their intercalation behavior," *Solid State Ionics* 151: 243-250 (2002). Here, this conversion was achieved by bubbling CO$_2$ through an aqueous suspension of α-NaMnO$_2$ at 80° C. for 3 h. A disproportionation mechanism has been proposed to explain the oxidation state change of Mn in α-NaMn(III)O$_2$ when it converts into the birnessite phase with an average oxidation state of 3.5-3.8:

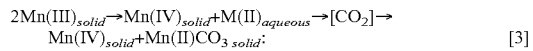

The Mn(IV) remained in the solid birnessite phase while Mn(II) was believed to dissolve in the aqueous phase. An insoluble Mn(II) salt or other compounds with Mn(II) were expected to form in the CO$_2$-assisted hydrolysis of α-NaMnO$_2$. Very weak and broad diffraction peaks corresponding to the MnCO$_3$ and Mn$_3$O$_4$ phases were present in the sample collected after hydrolysis of α-NaMnO2 with CO$_2$ under ambient condition (FIG. 5, ii). However, characteristic diffraction peaks for MnCO3 and Mn$_3$O$_4$ phases were observed after hydrolysis of α-NaMnO$_2$ with CO$_2$ under hydrothermal conditions (FIG. 5, iii). Accelerated crystal growth under hydrothermal conditions was most likely responsible for MnCO$_3$ and Mn$_3$O$_4$ crystals large enough to be detected by the diffraction measurements. The presence of the MnCO$_3$ and Mn$_3$O$_4$ phases provided strong evidence to support the disproportionation mechanism (Eq. 3; implies the average oxidation state of Mn in all Mn-containing solids is still +3).

Example 7

Step 4: Oxygen volution by thermal reduction of solids from Na$^+$ extraction of α-NaMnO$_2$. Thermal reduction of the mixture formed after sodium extraction of α-NaMnO2 (FIG. 6A, i) in Ar at 850° C. allowed for recovery of Mn$_3$O$_4$. The layered structure of protonic birnessite collapsed upon heating to 180° C. in Ar, presumably yielding amorphous Mn(III, IV)O$_x$ (FIG. 6A, ii). The amorphous phase persisted up to 500° C., where broad and weak diffraction peaks of Mn$_3$O$_4$ begin to appear. These results were consistent with the temperature-programmed desorption profile of O$_2$ (FIG. 6B, ii), with the onset of the O$_2$ desorption peak at approximately 450° C. The first oxygen desorption peak at approximately 565° C. from the mixture was attributed to the thermal reduction of MnO$_2$ to Mn$_2$O$_3$ (FIG. 6B, i), indicating the reduction of amorphous MnO$_2$ to Mn$_2$O$_3$. The diffraction peaks of Mn$_3$O$_4$ for the Na$^+$ extracted mixture gradually grew more intense and narrow as temperature increased; however, no diffraction peaks corresponding to MnO$_2$ or Mn$_2$O$_3$ were observed throughout the temperature range tested. The oxygen desorption peaks for the Na$^+$ extracted phase above 565° C. did not correspond to the desorption peaks from the reduction of Mn$_2$O$_3$ to Mn$_3$O$_4$ at 810° C. (FIG. 6B, i); these desorption events were attributed to the solid state reaction between amorphous Mn$_2$O$_3$ and MnO present in the mixture. The CO$_2$ desorption peak from the mixture appeared in a similar temperature range as the decomposition of MnCO$_3$ to MnO and CO$_2$ (FIG. 6B, iii and iv), confirming the presence of MnCO$_3$. The XRD pattern for the sample after thermal reduction was almost identical to that of commercial Mn$_3$O$_4$, except for a very weak peak at approximately 16° C. corresponding to a trace amount of α-Na$_{0.7}$MnO$_{2.14}$.

Example 8

Recyclability of the complete cycle. The Mn-based thermochemical system described herein exhibited >90% yield for both hydrogen and oxygen evolution and showed no sign of deactivation during five cycles (FIG. 7). The amount of O$_2$ released from a thermal reduction of a commercial, crystalline Mn$_2$O$_3$ to form Mn$_3$O$_4$ (FIG. 7, solid black circle) was identical to that released from the thermal reduction presented above, consistent with the recovery of Mn$_3$O$_4$ in the thermochemical cycle. Furthermore, the XRD pattern of the Mn$_3$O$_4$ recovered after the oxygen evolution was identical among the five cycles (FIG. 8) and matched the reference diffraction pattern.

A key feature contributing to the recyclability of the Mn-based system was the complete shuttling of Na$^+$ into and out of the manganese oxides. The Na$^+$ incorporation apparently takes advantage of thermodynamically favorable reactions (FIG. 2, steps 1 and 2) to form α-NaMnO$_2$. The Na$^+$ extraction step exploited the mobility of Na$^+$ in the layered structure when intercalated by water, and was further enhanced by the presence of CO$_2$, which drove the equilibrium towards the mixture of protonic birnessite, Mn$_3$O$_4$, and MnCO$_3$. This mixture could be thermally reduced to Mn$_3$O$_4$ at 850° C., closing the thermochemical cycle. Importantly, the trace amount of by-product formed by the incomplete Na$^+$ extraction was reintegrated into the α-NaMnO$_2$ phase in the next cycle, avoiding the accumulation of a permanent, inactive phase.

Example 8

Step 3: Na$^+$ extraction of α-NaMnO$_2$ at elevated temperatures/pressures: Separate experiments were conducted to investigate the ability to extract Na$^+$ from α-NaMnO$_2$, analogous to the experiments described in Example 6. In each case, sufficient water was added to ensure that liquid water was always present under the reaction conditions. These experiments were conducted at temperatures in a range of 100° C. and 200° C. and pressures upwards of 50 bar, under conditions where liquid water was still present to provide for the hydrolytic extractions. As shown in FIG. 10, these experiments seemed to show no advantage in using temperatures much above about 140° C., the degree of $Na^+$ being about the same at temperatures above this level. Otherwise, the experiments demonstrate that the catalytic cycle performs comparably to that described in Examples 5 to 7, using this method of extraction. See FIGS. 11-16. Nearly 90% of the amount of hydrogen formation can be reached using the recovered metal oxides (after thermal reduction) via the ion extraction treatment described in this section.

Investigating various combinations of metal oxides with spinel structure ($Mn_3O_4$, $Fe_3O_4$ and $Co_3O_4$) and alkali carbonates ($Li_2CO_3$, $Na_2CO_3$ and $K_2CO_3$) in thermochemical cycles for both water splitting and $CO_2$ reduction. The reactivity patterns of the metal oxide and alkali carbonate combinations towards water splitting and $CO_2$ reduction were investigated and elucidated.

Example 9

Reactions Between $Mn_3O_4$ and alkali carbonates ($Li_2CO_3$, $Na_2CO_3$ and $K_2CO_3$): $Mn_3O_4$ was reacted with $Li_2CO_3$ and $Na_2CO_3$ in Ar at or below 850° C., releasing $CO_2$ as the only product in the gas phase; no appreciable reaction occurred between $Mn_3O_4$ and $K_2CO_3$ in this temperature range (FIG. 17A, the molar ratio of $Mn_3O_4$ and alkali carbonates is 2:3). The $CO_2$ evolution peaks were at 625 and 850° C. for $Mn_3O_4$/$Li_2CO_3$ and $Mn_3O_4$/$Na_2CO_3$, respectively. In contrast, no detectable amount of $CO_2$ was produced with the $Mn_3O_4$/$K_2CO_3$ mixture below or at 850° C. These observations indicated the reactivity of alkali carbonates with $Mn_3O_4$, gauged by the temperature of $CO_2$ evolution peak, follows the sequence: $Li_2CO_3 > Na_2CO_3 > K_2CO_3$.

Unlike the reaction between $Mn_3O_4$ and $Na_2CO_3$ (reaction 1), where all Mn(II) species existed in the form of MnO after reaction, $Li_2Mn_2O_4$ and $Li_{0.4}Mn_{0.6}O$ phases were identified by powder X-ray diffraction (XRD) measurements after the temperature ramp-and-hold to 850° C. for $Li_2CO_3$/$Mn_3O_4$ in the absence of water (bottom trace, FIG. 18A). Since the atomic molar ratio of Li to Mn was 1:1 in the starting mixture, a small fraction of Li-containing phase must not have been detected by XRD. This result could have either be due to the crystal size of the Li-containing phase being below the detection limit of XRD, or due to the Li-containing phase being amorphous. No significant difference in the powder XRD pattern was observed after heating the $K_2CO_3$/$Mn_3O_4$ mixture in Ar atmosphere to 850° C. (bottom and middle traces, FIG. 18B), consistent with the lack of $CO_2$ evolution.

Hydrogen evolution was observed for $Mn_3O_4$/$Li_2CO_3$ and $Mn_3O_4$/$Na_2CO_3$ at or below 850° C., but not for $Mn_3O_4$/$K_2CO_3$ (FIG. 17B). The solid after the thermal treatment described in FIG. 17A was cooled down to 200° C., and subjected to a second temperature ramp-and-hold treatment to 850° C. in $D_2O$/Ar (5%/95%). $D_2$ evolution was detected from ~540° C. and peaks at ~645° C. and for $Mn_3O_4$/$Li_2CO_3$ (trace i in FIG. 17B). Little $CO_2$ was produced during reaction (trace ii in FIG. 17B), indicating most of the $Li_2CO_3$ had reacted with $Mn_3O_4$ during thermal treatment prior to water introduction. Based on the XRD data, only the orthorhombic $LiMnO_2$ phase was present after the hydrogen evolution reaction, suggesting all Mn(II) in $Mn_3O_4$ had been oxidized to Mn(III) (middle trace in FIG. 18A). $D_2$ evolution occurred at 850° C. on $Mn_3O_4$/$Na_2CO_3$ (trace iii in FIG. 17B), and the maximum rate of hydrogen evolution at 850° C. was only 1/50 of that for $Mn_3O_4$/$Li_2CO_3$ (an indication that $Li_2CO_3$ is more active in promoting the hydrogen evolution reaction than $Na_2CO_3$). For both $Mn_3O_4$/$Li_2CO_3$ and $Mn_3O_4$/$Na_2CO_3$, the total amounts of hydrogen detected were close to the theoretical amount expected for the total oxidation of the Mn(II) to Mn(III). The concurrent evolution of $CO_2$ with hydrogen suggested that not all the $Na_2CO_3$ was consumed in the reaction with $Mn_3O_4$ prior to the water introduction, and this result was consistent with the Examples above. In addition, the fact that the ratio of the amount of $CO_2$ produced before and after water introduction was very close to 2 indicated that $Na_2CO_3$ extracts all Mn(III) in $Mn_3O_4$ but is unable to react with the Mn(II) species in the absence of water. α-$NaMnO_2$ was formed as the only solid product after the hydrogen evolution reaction. No detectable amount of hydrogen was produced for $Mn_3O_4$/$K_2CO_3$, suggesting no oxidation of Mn(II) had taken place. $CO_2$ was observed at 850° C. in the presence of water, and its amount was roughly equal to that expected from the total decomposition of $K_2CO_3$. Unreacted $Mn_3O_4$ and K-birnessite were identified after reacting with water at 850° C. by XRD. However, not all peaks in the XRD pattern were accounted for, partly due to the hydroscopic nature of the powder, which formed a wet layer during the time for one powder XRD measurement (ca. 20 min) The solid-phase reaction between $Mn_3O_4$ with alkali carbonate was carried out prior to the introduction of water in order to independently determine the temperatures at which these reactions take place. In practical implementations, these two steps can be combined into one.

Li cation removal from $LiMnO_2$ could not be achieved under similar conditions to that of sodium cation removal from α-$NaMnO_2$, i.e. stirring in an aqueous suspension at 80° C. with $CO_2$ bubbling through for 3 h (henceforth referred to as water/$CO_2$ treatment). As shown above, the Na cation could be completely extracted from α-$NaMnO_2$ via the water/$CO_2$ treatment. The XRD patterns of $LiMnO_2$ before and after the water/$CO_2$ treatment were very similar (top and middle traces, FIG. 18A), suggesting that little Li cation had been removed from $LiMnO_2$. Moreover, no detectable amount of $O_2$ was observed when the water/$CO_2$ treated $LiMnO_2$ was subjected to a temperature ramp-and-hold procedure to 850° C. in Ar (confirming the lack of Li cation removal during the water/$CO_2$ treatment).

A fraction of $CO_2$ formed from the reaction of $Mn_3O_4$ with $Li_2CO_3$ was reduced to CO during the temperature ramp-and-hold to 850° C. in the absence of water, but not for $Na_2CO_3$ or $K_2CO_3$. For both $Mn_3O_4$/$Li_2CO_3$ and $Mn_3O_4$/$Na_2CO_3$, all Mn(II) species in $Mn_3O_4$ were oxidized to Mn(III) in $LiMnO_2$ and α-$NaMnO_2$, respectively, after reacting with water at 850° C. (FIG. 17B). The amount of $D_2$ produced from $Mn_3O_4$/$Na_2CO_3$ was within experimental error (±10%) of the theoretical maximum amount; whereas only ~70% of the stoichiometric amount of $D_2$ was detected for $Mn_3O_4$/$Li_2CO_3$. Quantitative mass spectrometric analysis showed that the remaining ~30% of Mn(II) was oxidized by the $CO_2$ released during the reaction between $Mn_3O_4$ and $Li_2CO_3$ prior to the introduction of water, producing CO (FIG. 19). In addition to the parent ion of $CO_2$ (m/z 44), m/z 28 signal was detected as a cracking fragment of $CO_2$. For pure $CO_2$, the m/z 28 signal should theoretically trace the parent ion (m/z 44) signal, differing only by a scaling factor. FIG. 19 shows that m/z 28 traces exactly m/z 44 by a factor of ~0.2 at temperatures below 685° C., beyond which the two traces deviate significantly from each other. The difference in the two traces at temperature above 685° C. was attributed to CO produced from the reaction of $CO_2$ with the Mn(II) species.

Experiment 10: Reactions Between $Fe_3O_4$ and alkali carbonates ($Li_2CO_3$, $Na_2CO_3$ and $K_2CO_3$): Both hydrogen evolution and $CO_2$ reduction reactions occurred on $Fe_3O_4$/$Na_2CO_3$ at or below 850° C. (FIG. 20). $Na_2{}^{13}CO_3$, rather than $Na_2{}^{12}CO_3$, was used to differentiate the contribution of CO produced from the carbonate and the $CO_2$ in the feed. Three $^{13}CO_2$ evolution peaks were observed during the temperature ramp-and-hold to 850° C. for $Fe_3O_4/Na_2{}^{13}CO_3$ (molar ratio of 2:3) in Ar. The peak at 165° C. was likely from the decomposition of a sodium bicarbonate impurity in the sodium carbonate, whereas the two main $^{13}CO_2$ evolution peaks at 725 and 850° C. were attributed to the reaction of $Fe_3O_4$ with $Na_2{}^{13}CO_3$. The MS signal for $^{13}CO$ (m/z 29, corrected for the contribution from the cracking fragment of $^{13}CO_2$) started to rise at 735° C., and peaked at 850° C. before returning to the baseline. When $D_2O$ was introduced at 850° C., a sharp $D_2$ evolution peak was observed, indicating not all Fe(II) in $Fe_3O_4$ had been oxidized by $CO_2$. Approximately 85% and 15% of Fe(II) was oxidized by $^{13}CO_2$ and $D_2O$, respectively. Replacing $Na_2{}^{13}CO_3$ with $Na_2{}^{12}CO_3$ in the initial solid mixture yielded very similar results. Since the molar ratio of the starting mixture of $Fe_3O_4/Na_2CO_3$ was 2:3, the total amount of $CO_2$ released from $Na_2CO_3$ was 3 times that needed to fully oxidize all the Fe(II) in $Fe_3O_4$. The fact that ~85% of Fe(II) was oxidized indicated that close to 30% $CO_2$ was consumed in reduction reaction. Approximately 80% of the Fe(II) was oxidized by $CO_2$ (produced from the reaction between $Fe_3O_4$ and $Na_2CO_3$) during the temperature ramp-and-hold to 750° C. in Ar. The onset of CO evolution occurred at ~735° C. (FIG. 20), whereas water oxidized Fe(II) to Fe(III) with the stoichiometric production of hydrogen at as low as 560° C. (Table 1). The remaining Fe(II) after the completion of $CO_2$ evolution from the decomposition of carbonates could then be oxidized to Fe(III) by water via hydrogen evolution reaction. Therefore, the temperature of thermal treatment of $Fe_3O_4/Na_2CO_3$ can be used to control the dominant oxidant for the oxidation of Fe(II) (FIG. 21).

TABLE 1

Onset temperatures for hydrogen evolution and $CO_2$ reduction reactions

| Sample | Onset temperature (° C.) | | |
|---|---|---|---|
| | $CO_2$ | $D_2$ | CO |
| $Mn_3O_4/Li_2CO_3$ | 400 | 540 | 685 |
| $Mn_3O_4/Na_2CO_3$ | 515 | 850 | — |
| $Mn_3O_4/K_2CO_3$ | — | — | — |
| $Fe_3O_4/Li_2CO_3$ | 375 | 510 | 675 |
| $Fe_3O_4/Na_2CO_3$ | 385 | 500 | 735 |
| $Fe_3O_4/K_2CO_3$ | 445 | 500 | 805 |

All of the Fe(II) was oxidized to Fe(III) by $CO_2$ during the temperature ramp-and-hold to 850° C. in $CO_2$/Ar (2%/98%) (FIG. 21), producing a stoichiometric amount of CO with respect to Fe(II). This result suggested that the incomplete oxidation of Fe(II) during the temperature ramp-and-hold procedure conducted in Ar was caused by the limited supply of $CO_2$. This theory was also consistent with the observation that the MS signals for $^{13}CO$ and $^{13}CO_2$ decreased simultaneously (FIG. 20). In order to deconvolute the contributions of the $CO_2$ that evolved from the decomposition of the $Na_2CO_3$ and the $CO_2$ in the carrier gas in the $CO_2$ reduction reaction, $Fe_3O_4/Na_2{}^{13}CO_3$ was subjected to a temperature ramp-and-hold to 850° C. in a $^{12}CO_2$/Ar (2%/98%) atmosphere (FIG. 22). The onset of the $^{13}CO$ and $^{12}CO$ peaks occurred at similar temperature (~735° C.). The majority of the reduction product initially was $^{13}CO$, suggesting $^{13}CO_2$ from $Na_2{}^{13}CO_3$ was preferentially reduced. The proximity of the newly formed $^{13}CO_2$ to the Fe(II) species may play a key role. $^{12}CO$ became the dominant reduction product after $^{13}CO_2$ was exhausted. $^{13}CO$ accounted for approximately 30% of the reduction product and remainder was $^{12}CO$, with the total amount of CO produced ($^{12}CO$ and $^{13}CO$) being close to the amount required to fully oxidize all Fe(II) to Fe(III) (within ±10%).

Hydrogen evolution or $CO_2$ reduction reaction pathways could be controlled (reversibly) by tuning the relative concentrations of $CO_2$ and water. Upon the introduction of the first $D_2O$ pulse to $Fe_3O_4/Na_2CO_3$ at 850° C., the rate of CO production instantaneously decreased by more than a factor of 10, and $D_2$ evolution was observed (FIG. 23). In addition, the $CO_2$ concentration also spiked upon $D_2O$ introduction, indicating less $CO_2$ was consumed in the reduction reaction. The reverse occurred when the $D_2O$ pulses were stopped, i.e., CO production recovered instantaneously and the $D_2$ signal decreased to baseline. The pathway for oxidizing Fe(II) to Fe(III) could be controlled by the relative amounts of $CO_2$ and water present until the Fe(II) species was exhausted.

$CO_2$ reduction and hydrogen evolution reactions also took place on $Fe_3O_4/Li_2CO_3$ and $Fe_3O_4/K_2CO_3$ (FIG. 24). The CO evolution during the temperature ramp-and-hold to 850° C. in Ar started at 680 and 815° C. for $Fe_3O_4/Li_2CO_3$ and $Fe_3O_4/K_2CO_3$, respectively. Water ($D_2O$) was introduced at 850° C. after the CO signal returns to baseline, and the amounts of $D_2$ produced account for approximately 20% and 10% of the Fe(II) in $Fe_3O_4/Li_2CO_3$ and $Fe_3O_4/K_2CO_3$ respectively. The temperatures for the onset of the $D_2$ evolution for $Fe_3O_4$ and carbonates during the temperature ramp-and-hold in $D_2O$/Ar (5%/95%) were all around 500° C.

The powder XRD patterns showed only the $AFeO_2$ (A=Li, Na and K) phases after the temperature ramp-and-hold to 850° C. in Ar (FIG. 25). These results were consistent with the observation that 80% or more of the Fe(II) in $Fe_3O_4$ was oxidized to Fe(III) by the $CO_2$ from the carbonates. No detectable changes were observed for the solids collected before and after the introduction of water at 850° C. for all $Fe_3O_4$ and alkali carbonate systems.

Sodium and potassium could be removed from the iron oxide structure via the water/$CO_2$ treatment, resulting in a hydrated Fe(III) phase, whereas Li cation removal from $LiFeO_2$ could not be achieved under similar conditions.

Experiment 11: Reactions Between $Co_3O_4$ and alkali carbonates ($Li_2CO_3$, $Na_2CO_3$ and $K_2CO_3$): No $CO_2$ reduction was observed during the temperature ramp-and-hold to 850° C. for $Co_3O_4$ with any of the three alkali carbonates ($Li_2CO_3$, $Na_2CO_3$ and $K_2CO_3$) in Ar; nor did hydrogen evolution occur upon the introduction of $D_2O$ at 850° C. However, $Co_3O_4$ did react with $Li_2CO_3$ during the temperature ramp to 850° C., as evidenced by the $LiCoO_2$ and $Li_{0.21}Co_{0.79}O$ phases identified by powder XRD measurement of the solid collected after the thermal treatment and the sharp $CO_2$ evolution peak at 575° C. A $CO_2$ evolution peak occurred at ~850° C. and had a long tail for both $Co_3O_4/Na_2CO_3$ and $Co_3O_4/K_2CO_3$ mixtures during the temperature ramp-and-hold procedure. The total amount of $CO_2$ evolved was close to that expected for total decomposition of $Na_2CO_3$ and $K_2CO_3$. No sodium or potassium-containing phase was identified by XRD after the temperature and hold procedure for $Co_3O_4/Na_2CO_3$ and $Co_3O_4/K_2CO_3$, also suggesting the total decomposition of the carbonates. The lack of crystalline sodium or potassium containing phases might be attributed to the hydroscopic nature of sodium and potassium oxides and hydroxides. The X-ray diffraction patterns showed little change after the introduction of water at 850° C. for all alkali carbonates, consistent with the lack of hydrogen evolution.

General Discussion of Comparison of Reactivity Among Alkali Metal Carbonates: The ability of alkali carbonates to promote hydrogen evolution and $CO_2$ reduction with a given metal oxide that has a spinel structure followed the descending order: $Li_2CO_3 > Na_2CO_3 > K_2CO_3$ (e.g., evaluated by the onset temperatures for hydrogen evolution and $CO_2$ reduction reactions on various combinations of $Mn_3O_4$ and alkali carbonates (Table 1)). $D_2$ started to evolve on $Li_2CO_3/Mn_3O_4$ at 540° C., and in contrast no detectable amount of $D_2$ was observed on $Na_2CO_3/Mn_3O_4$ until 850° C. In addition, the peak rate of $D_2$ evolution on $Li_2CO_3/Mn_3O_4$ is ~50 times that measured from $Na_2CO_3/Mn_3O_4$. No $D_2$ evolution was detected for $K_2CO_3/Mn_3O_4$ at reaction temperature up to 850° C. For the $CO_2$ reduction reaction, the onset temperatures for CO evolution were 675, 735 and 805° C. for $Li_2CO_3/Fe_3O_4$, $Na_2CO_3/Fe_3O_4$ and $K_2CO_3/Fe_3O_4$, respectively, further confirming the trend in reactivity for the carbonates investigated. Comparison of reactivity among the spinel metal oxides General Discussion of Comparison of Reactivity Among Spinel Metal Oxides: The reactivity for hydrogen evolution and $CO_2$ reduction reactions of spinel metal oxides with a given alkali carbonate followed the descending order: $Fe_3O_4 > Mn_3O_4 > Co_3O_4$. Hydrogen evolution occurred on $Fe_3O_4$ with all three alkali carbonates, whereas $Mn_3O_4$ had to be combined with the more reactive carbonates, i.e., $Li_2CO_3$ and $Na_2CO_3$, for the evolution of hydrogen to be observed. For $Co_3O_4$, hydrogen evolution did not occur even when it was combined with the most reactive lithium carbonate. This reactivity trend was more pronounced for the $CO_2$ reduction reaction, which occurred on all $Fe_3O_4$ containing sample with alkali carbonates. In contrast, only when $Mn_3O_4$ combined with lithium carbonate, could CO evolution be detected. None of the $Co_3O_4$ containing samples was active for $CO_2$ reduction at or below 850° C.

Experiment 12: Thermal reduction of the metal oxides. After removing alkali cations from the metal oxide structure, the solids were subject to temperature ramp-and-hold procedures in Ar to thermally reduce to the spinel oxides (FIG. 26). The alkali cation extracted Mn(III) and Fe(III) oxides were fully reduced to $Mn_3O_4$ and $Fe_3O_4$ at 850 and 1150° C., respectively, similar to the temperatures for thermal reduction of $Mn_2O_3$ and $Fe_2O_3$. $Co_3O_4$ was reduced to CoO during the temperature ramp of the $Co_3O_4/Na_2CO_3$ mixture to 850° C., as evidenced by the powder XRD measurement and the $O_2$ evolution peak at ~850° C. for pure $Co_3O_4$.

The extraction of alkali cations from the alkali metal(III) oxides was seen as important in being able to close the thermochemical cycle at reasonable temperatures (<1000° C.), since alkali metal(III) oxides could not easily be thermally reduced (<1500° C.). The degree of difficulty for alkali cation extraction paralleled the reactivity of the corresponding alkali carbonates: $Li^+ > Na^+ > K$. No appreciable lithium extraction was observed for $LiFeO_2$ and $LiMnO_2$, whereas almost complete sodium extraction could be achieved for both $NaFeO_2$ and $NaMnO_2$. Furthermore, complete potassium cation removal could also be achieved by the water/$CO_2$ treatment from $KFeO_2$.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A method of thermochemically forming $H_2$, $O_2$, or both $H_2$ and $O_2$ from water, said method comprising:
   (a) contacting a composition comprising a spinel-type transition metal oxide of formula $M_3O_4$ with an alkali metal carbonate, bicarbonate, or mixture thereof in the presence of $H_2O$ at a first temperature in a range of from 450° C. to 1000° C. to form $H_2$, $CO_2$, and an alkali metal ion-transition metal oxide, said alkali metal ion-transition metal oxide having an average transition metal oxidation state that is higher than the average oxidation state of the transition metal in the spinel-type transition metal oxide;
   (b) hydrolytically extracting at least a portion of alkali metal ions from the alkali metal ion-transition metal oxide by the reaction with $CO_2$ and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion -transition metal oxide; and
   (c) thermochemically reducing the transition metal composition of step (b) at a third temperature in a range of from 450° C. to 1150° C., with the associated formation of $O_2$;
   wherein the transition metal, M, comprises iron, manganese, or a combination thereof, and the corresponding spinel-type transition metal oxide comprises $Fe_3O_4$, $Mn_3O_4$, or a solid solution or physical mixture thereof; and
   wherein the alkali metal ion comprises sodium ion, potassium ion, or a combination thereof.

2. The method of claim 1, wherein the step (a) of contacting the composition comprising a spinel-type transition metal oxide of formula $M_3O_4$ with an alkali metal carbonate, bicarbonate, or mixture thereof is done stepwise first in the absence and then in the presence of $H_2O$.

3. The method of claim 1, wherein the carbonate, bicarbonate, or mixture thereof comprises a carbonate.

4. The method of claim 1, wherein the alkali metal ion-transition metal oxide comprises a composition having an empirical formula $AMO_2$, where A represents the alkali metal ion.

5. The method of claim 1, wherein at least one of the first and third temperatures is in a range of from 750° C. to 850° C.

6. The method of claim 1, wherein the second temperature is (1) in a range of from about 60° C. to about 95° C., at ambient atmospheric pressure or (2) in a range of from about 100° C. to about 250° C., wherein the $CO_2$ is present at a partial pressure in a range of from about 1 bar to about 25 bar.

7. The method of claim 1, wherein the third temperature is in a range of from 550° C. to 1150° C.

8. The method of claim 1, wherein the thermochemical reduction of the oxidized-transition metal oxide results in a regeneration of the spinel-type transition metal oxide of (a).

9. The method of claim 1, wherein the transition metal comprises manganese; the carbonate, bicarbonate, or mixture thereof comprises a carbonate; and the alkali metal ion comprises sodium ion.

10. The method of claim 9, wherein the alkali metal ion-stabilized oxidized-transition metal oxide comprises a composition having an empirical formula of $NaMnO_2$, formed by at least one reaction resulting from contacting sodium carbonate and $Mn_3O_4$.

11. The method of claim 10, wherein the at least one reaction resulting from contacting sodium carbonate and $Mn_3O_4$ is according to the stoichiometries:

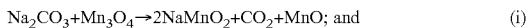

$$Na_2CO_3 + Mn_3O_4 \rightarrow 2NaMnO_2 + CO_2 + MnO; \text{ and} \quad (i)$$

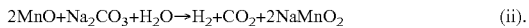

$$2MnO + Na_2CO_3 + H_2O \rightarrow H_2 + CO_2 + 2NaMnO_2. \quad (ii)$$

12. The method of claim 1, wherein the alkali metal ion-stabilized oxidized-transition metal oxide comprises $\alpha$-$NaMnO_2$.

13. The method of claim 1, wherein the alkali metal ion is $Na^+$ and the alkali metal ion transition metal oxide comprises a composition having an empirical formula $NaMnO_2$.

14. The method of claim 13, wherein the alkali metal ion transition metal oxide comprises a composition having a stoichiometry of $NaMnO_2$ and the extraction of the $Na^+$ from the $NaMnO_2$ is characterized by a stoichiometry:

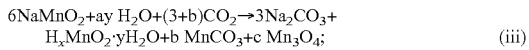

$$6NaMnO_2 + ay\,H_2O + (3+b)CO_2 \rightarrow 3Na_2CO_3 + H_xMnO_2 \cdot yH_2O + b\,MnCO_3 + c\,Mn_3O_4; \quad (iii)$$

wherein $a+b+3c=6$ and $(4-x)\cdot a+2b+8c=18$.

15. The method of claim 1, wherein the transition metal composition of step (b) comprises a protonic birnessite, and the thermochemical reduction of the this product is done at the third temperature in a range of from 750° C. to 850° C.

16. The method of claim 15, wherein (c) is characterized by a stoichiometry:

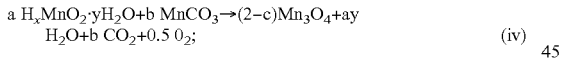

$$a\,H_xMnO_2 \cdot yH_2O + b\,MnCO_3 \rightarrow (2-c)Mn_3O_4 + ay\,H_2O + b\,CO_2 + 0.5\,O_2; \quad (iv)$$

wherein $a+b+3c=6$ and $(4-x)\cdot a+2b+8c=18$.

17. The method of claim 1, said method comprising:
(a) contacting a composition comprising a spinel-type $Mn_3O_4$ with sodium carbonate in the presence of $H_2O$ at a first temperature in a range of from about 550° C. to about 900° C., to form $H_2$, $CO_2$, and a sodium birnessite-type $A_xMnO_2$ ($0<x<1$), the sodium birnessite-type manganese dioxide having an average transition metal oxidation state that is higher than the average oxidation state of the transition metal in the spinel-type $Mn_3O_4$;
(b) hydrolytically extracting at least a portion of sodium cations from the sodium birnessite-type manganese dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising an protonic birnessite in which the average oxidation state of the transition metal in the protonic birnessite is the same as the average oxidation state of the transition metal in the sodium birnessite-type manganese dioxide; and
(c) thermochemically reducing the transition metal composition of step (b) at a third temperature in a range of from about 550° C. to about 900° C., preferably about 850° C., with the associated formation of $O_2$.

18. The method of claim 1, wherein the transition metal comprises iron; the carbonate, bicarbonate, or mixture thereof comprises a carbonate; and the alkali metal ion comprises sodium ion, potassium ion, or a combination thereof.

19. The method of claim 1, wherein the alkali metal ion-transition metal oxide is $NaFeO_2$ or $KFeO_2$, formed by the reactions between $Fe_3O_4$ and sodium carbonate or between $Fe_3O_4$ and potassium carbonate, respectively.

20. The method of claim 1, wherein the alkali metal ion is $Na^+$ or $K^+$ or a combination thereof, and the alkali metal ion-transition metal oxide comprises a composition having a stoichiometry of $NaFeO_2$ or $KFeO_2$.

21. The method of claim 1, said method comprising
(a) contacting a composition comprising a spinel-type $Fe_3O_4$ with sodium or potassium carbonate, or a mixture thereof, in the presence of $H_2O$ at a first temperature in a range of from about 550° C. to about 900° C., to form $H_2$, $CO_2$, and a sodium- or potassium-type $A_xFeO_2$ ($0<x<1$), the sodium- or potassium-type iron dioxide having an average transition metal oxidation state that is higher than the average oxidation state of the transition metal in the spinel-type $Fe_3O_4$;
(b) hydrolytically extracting at least a portion of sodium cations from the sodium- or potassium-type iron dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising $Fe_2O_3$ or a hydrated form thereof, in which the average oxidation state of the transition metal is the same as the average oxidation state of the transition metal in the $Fe_2O_3$ or a hydrated form thereof; and
(c) thermochemically reducing the transition metal composition of step (b) at a third temperature in a range of from about 1150° C. to about 1250° C., with the associated formation of $O_2$.

22. A catalytic cycle comprising the method of claim 1, the steps being performed in order (a), then (b), then (c) at least 5 times.

23. The method of claim 17, wherein the sodium birnessite-type $A_xMnO_2$ ($0<x<1$) is derived from $\alpha$-$NaMnO_2$.

24. The method of claim 21, wherein the sodium- or potassium-type $A_xFeO_2$ ($0<x<1$), is $NaFeO_2$ or $KFeO_2$.

* * * * *